(12) United States Patent
Sato et al.

(10) Patent No.: US 12,499,659 B2
(45) Date of Patent: Dec. 16, 2025

(54) INFORMATION PROCESSING APPARATUS, INFORMATION PROCESSING METHOD, AND NON-TRANSITORY COMPUTER READABLE STORAGE MEDIUM

(71) Applicant: SoftBank Corp., Tokyo (JP)

(72) Inventors: Tetta Sato, Tokyo (JP); Kazuhiko Watabe, Tokyo (JP); Maiko Imanishi, Tokyo (JP); Yuma Matsuoka, Tokyo (JP); Toshiya Ishiida, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 382 days.

(21) Appl. No.: 18/021,180

(22) PCT Filed: Nov. 18, 2021

(86) PCT No.: PCT/JP2021/042453
§ 371 (c)(1),
(2) Date: Feb. 14, 2023

(87) PCT Pub. No.: WO2022/113879
PCT Pub. Date: Jun. 2, 2022

(65) Prior Publication Data
US 2023/0316723 A1    Oct. 5, 2023

(30) Foreign Application Priority Data
Nov. 27, 2020    (JP) .................. 2020-197467

(51) Int. Cl.
*G06V 10/00*    (2022.01)
*G06V 10/774*    (2022.01)
(Continued)

(52) U.S. Cl.
CPC .......... *G06V 10/774* (2022.01); *G06V 10/776* (2022.01); *G06V 10/945* (2022.01)

(58) Field of Classification Search
CPC ........ G06N 20/00; G06N 20/10; G06V 10/82; G06V 10/774; G06V 10/776; G06V 10/945; G06F 16/903; Y02P 90/30; G06Q 50/10
See application file for complete search history.

(56) References Cited

U.S. PATENT DOCUMENTS 10,769,766 B1 *  9/2020 Padfield .............. G06V 10/454
11,200,452 B2 * 12/2021 Van Der Stockt .... G06F 18/214
(Continued)

FOREIGN PATENT DOCUMENTS

CN    109389275 A    2/2019
JP    2015-60432 A    3/2015
(Continued)

OTHER PUBLICATIONS

International Search Report and Written Opinion mailed on Feb. 8, 2022, received for PCT Application PCT/JP2021/042453, filed on Nov. 18, 2021, 9 pages including English Translation.
(Continued)

*Primary Examiner* — Amir Alavi
(74) *Attorney, Agent, or Firm* — XSENSUS LLP

(57) ABSTRACT

An information processing apparatus includes: an acceptance unit that accepts processing results of a plurality of processing targets including ground truth processing targets associated with ground truth processing results every time an operator completes processing on part of the processing targets; and a calculation unit that, when processing targets associated with the processing results accepted by the acceptance unit are the ground truth processing targets, calculates an evaluation value indicating an evaluation on the operator based on comparison between the processing results accepted by the acceptance unit and the ground truth processing results.

20 Claims, 13 Drawing Sheets

(51) Int. Cl.
G06V 10/776 (2022.01)
G06V 10/94 (2022.01)

(56) References Cited

U.S. PATENT DOCUMENTS

| | | | |
|---|---|---|---|
| 11,200,460 B2 * | 12/2021 | Kamon | G06N 3/084 |
| 11,250,296 B2 * | 2/2022 | Brower | G06F 18/2148 |
| 11,379,718 B2 * | 7/2022 | Desmond | G06F 18/2433 |
| 11,941,493 B2 * | 3/2024 | Desmond | G06N 20/00 |
| 12,026,224 B2 * | 7/2024 | Palla | G06N 5/022 |
| 12,033,391 B2 * | 7/2024 | Singh | G06N 3/02 |
| 12,223,428 B2 * | 2/2025 | Elluswamy | G05D 1/0221 |
| 2020/0042794 A1 | 2/2020 | Ishikawa et al. | |
| 2020/0311474 A1 | 10/2020 | Toyoda et al. | |
| 2023/0316723 A1 * | 10/2023 | Sato | G06Q 50/10 |
| | | | 382/155 |
| 2024/0071057 A1 * | 2/2024 | Amthor | G06V 10/776 |

FOREIGN PATENT DOCUMENTS

| | | |
|---|---|---|
| JP | 2016-115274 A | 6/2016 |
| JP | 2017-162232 A | 9/2017 |
| JP | 2020-24665 A | 2/2020 |
| JP | 2020-101968 A | 7/2020 |
| JP | 2020-160896 A | 10/2020 |

OTHER PUBLICATIONS

Japanese Notice of Reasons for Refusal issued Aug. 27, 2024 in corresponding Japanese Patent Application No. 2022-193776, 3 pages.
Chinese Office Action issued Oct. 18, 2025 in corresponding Chinese Patent Application No. 202180050766.9, 17 pages.

* cited by examiner

FIG.12

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

The present application is based on PCT filing PCT/JP2021/042453, filed Nov. 18, 2021, which claims priority from JP 2020-197467, Nov. 27, 2020, the entire contents of each are incorporated herein by reference.

FIELD

The present invention relates to an information processing apparatus, an information processing method, and an information processing program.

BACKGROUND

Conventionally, there is known a technique for making it possible to ensure quality of results of processing manually performed on a plurality of processing targets. For example, there is known a technique that assists creation of training data that a machine learning model is caused to learn. For example, there is known a technique that specifies a training image as a specific training image when a supervision class associated with the training image in advance and a class in which the training image is classified the most by a learned classifier differ are different.

CITATION LIST

Patent Literature

Patent Literature 1: JP 2017-162232 A

SUMMARY

Technical Problem

There is a demand for a technique that makes it possible to ensure quality of results of processing manually performed on a plurality of processing targets.

Solution to Problem

An information processing apparatus includes: an acceptance unit that accepts processing results of a plurality of processing targets including ground truth processing targets associated with ground truth processing results every time an operator completes processing on part of the processing targets; and a calculation unit that, when processing targets associated with the processing results accepted by the acceptance unit are the ground truth processing targets, calculates an evaluation value indicating an evaluation on the operator based on comparison between the processing results accepted by the acceptance unit and the ground truth processing results.

BRIEF DESCRIPTION OF DRAWINGS

FIG. 12 is a view illustrating an example of a screen of an administrator apparatus according to the embodiment.

DESCRIPTION OF EMBODIMENTS

Figure 1:
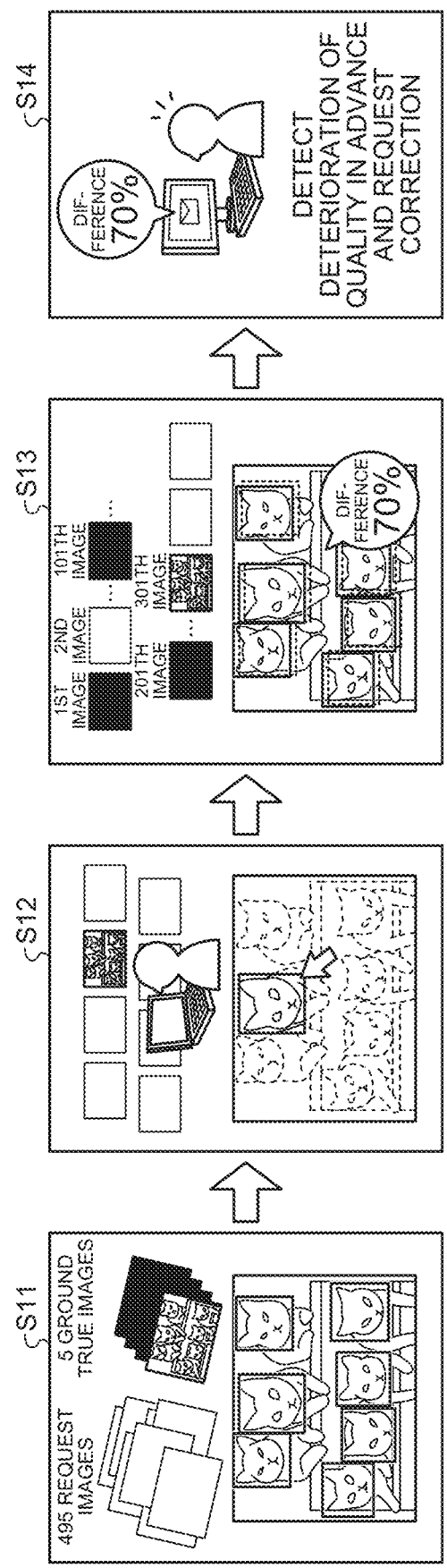
FIG. 1 is an explanatory view illustrating an outline of an information processing method according to an embodiment.

Hereinafter, aspects (referred to as "embodiments" below) for implementing an information processing apparatus, an information processing method, and an information processing program according to the present invention will be described in detail with reference to the drawings. Note that the embodiments do not limit the information processing apparatus, the information processing method, and the information processing program according to the present invention. Furthermore, in the following embodiments, the same parts will be assigned the same reference numerals, and overlapping description thereof will be omitted.

EMBODIMENT

1. Introduction

Conventionally, there is known a technique that assists creation of training data that a machine learning model is caused to perform supervised learning on. In general, training data for performing supervised learning includes a set of ground truth data and a label. Supervised learning is performed by causing a machine learning model to learn to output a correct output when an input (ground truth data) and a correct output (label) of the input are given as training data, and a certain input is accepted. In an AI industry, work of creating this training data (a set of ground truth data and a label) is called annotation. Annotation target data includes types such as an image, a text, and a voice depending on use of the machine learning model. For example, in a case where the use of the machine learning model is image recognition, annotation target data is an image.

Although such annotation work is performed manually, enormous training data such as approximately 100,000 to 1,000,000 items of training data is required to create an accurate machine learning model. Therefore, there is a vendor that creates training data. However, even if a requester who creates the machine learning model requests the vendor who creates the training data to create 500 sets of training data, there is a problem that, for example, there are only 50 sets of training data that can be used for learning among the sets of delivered training data, that is, quality of the created training data (accuracy of annotation is poor) is not ensured.

Therefore, in order to prevent the training data of poor annotation accuracy from being delivered as it is, the information processing apparatus 100 according to the present invention makes it possible to evaluate the annotation accuracy while a vendor is creating training data, and enable a requester to request the vendor to make correction in a case where the accuracy is poor. More specifically, the information processing apparatus 100 periodically performs progress examination in the middle of creating training data to evaluate annotation accuracy. Consequently, by periodically evaluating the quality on a regular basis, the information processing apparatus 100 can immediately detect deterioration of quality when the quality deteriorates, and consequently prevent deterioration of overall quality in advance. Therefore, the information processing apparatus 100 can ensure quality of results of processing such as annotation manually performed on a plurality of processing targets.

2. Outline of Information Processing

Hereinafter, an outline of an information processing method according to the embodiment will be described with reference to FIG. 1. FIG. 1 is an explanatory view illustrating an outline of the information processing method according to the embodiment. Annotation work according to the embodiment is performed when an operator of a vendor who has accepted a request from a requester selects an area where an object is captured from an image for which the request has been accepted. An example where an area of an image annotated by the requester (accurately annotated data) and an area of an image annotated by the operator are compared to evaluate accuracy of training data created by an operator will be described with reference to FIG. 1. Furthermore, the requester manages operator's work. Therefore, the requester will be referred to as an administrator below in some cases.

In FIG. 1, the requester requests creation of training data for detecting cats that are objects included in an image. The requester selects five images from the 500 images in advance, and associates a ground truth selection area with each of the selected five images. The information processing apparatus 100 obtains the 500 images including the five ground true images (also referred to as ground truth image) associated with the ground truth selection areas selected by the requester from an administrator apparatus 20 used by the requester (administrator) (step S11).

Subsequently, when accepting the 500 images, the information processing apparatus 100 decides an order for making the operator process the 500 images. For example, the information processing apparatus 100 determines an order (also referred to as a processing order below) for making the operator process the five ground true images among the 500 images. Subsequently, after determining the order for making the operator process the five ground true images, the information processing apparatus 100 determines the order for making the operator process the rest of 495 request images. For example, the information processing apparatus 100 determines to include the ground true images in the first, 101st, 201st, 301st, and 401st images among the 500 images. Subsequently, when determining the processing order of the 500 images accepted from the requester, the information processing apparatus 100 uploads the 500 images associated with the determined processing order to a cloud.

Furthermore, the operator of the vendor that has accepted the annotation request from the requester accesses the cloud to which work target images are uploaded via an operator apparatus 10 used by the operator. The information processing apparatus 100 displays the 500 images on a screen of the operator apparatus 10 in the order for making the operator process the 500 images one by one. The operator performs selection processing of selecting an area where the cat is captured, from the image displayed on the screen of the operator apparatus 10 (step S12). For example, the operator performs selection processing of manually selecting, from the image of the 301st image, seven respective rectangles (referred to as bounding boxes) respectively surrounding areas where seven cats are captured. The information processing apparatus 100 accepts the selection area of the image selected by the operator from the operator apparatus 10 every time the operator completes area the selection processing on one image.

Furthermore, when the image associated with the selection area accepted from the operator apparatus 10 is the ground truth image, the information processing apparatus 100 calculates a degree of overlap (matching degree) between the selection area accepted from the operator apparatus 10 and the ground truth selection area based on comparison between the selection area accepted from the operator apparatus 10 and the ground truth selection area (step S13). For example, the information processing apparatus 100 decides that the 301st image associated with the selection area accepted from the operator apparatus 10 is the ground truth image. Subsequently, the information processing apparatus 100 calculates the degree of overlap (matching degree) between the selection area of the operator and the ground truth selection area as 70%, based on the comparison between the selection area accepted from the operator apparatus 10 and the ground truth selection area.

After calculating the degree of overlap (matching degree) between the selection area accepted from the operator apparatus 10 and the ground truth selection area, the information processing apparatus 100 notifies the requester of a calculation result (step S14). Thus, the information processing apparatus 100 calculates the degree of overlap (matching degree) between the processing results of the selection processing on the ground truth images included in the first, 101st, 201st, 301st, and 401st images in the selection processing of the operator on the 500 images, and the ground truth processing results, and notifies the requester of the calculated degree of overlap. The requester who has accepted the notification can learn how accuracy of the processing results (also referred to as quality below) of the selection processing by the operator has transitioned by looking at the notification result.

For example, in a case where quality of processing results of the operator starts deteriorating in the middle of work on a plurality of images, the information processing apparatus 100 detects the deterioration of quality, and notifies the requester of the deterioration of quality. Consequently, the information processing apparatus 100 enables, for example, the requester to encourage the operator to correct the deterioration of the quality. Consequently, the information processing apparatus 100 can ensure quality of annotation manually performed on a plurality of images.

3. Configuration of Information Processing System

Figure 2:
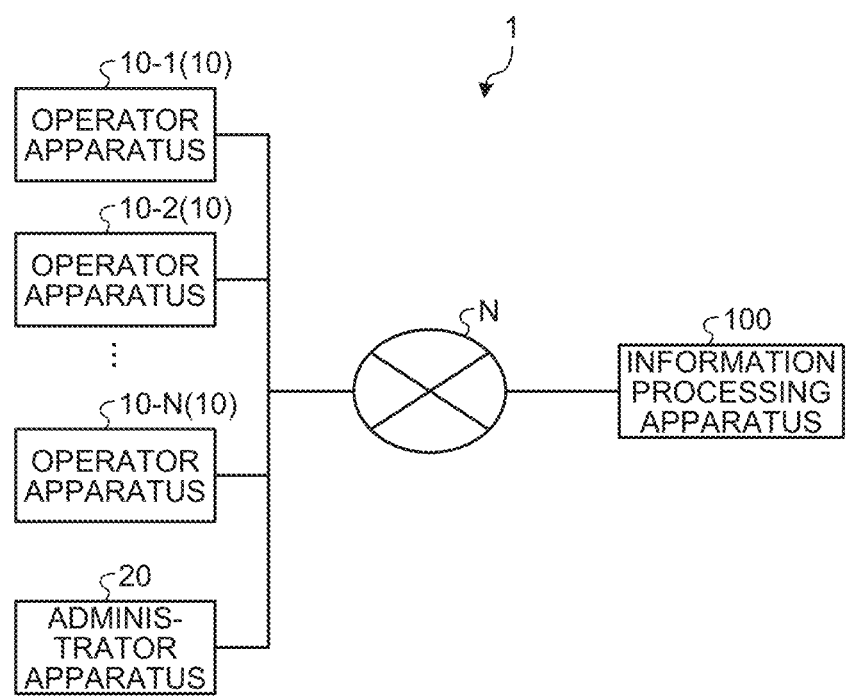
FIG. 2 is a view illustrating a configuration example of an information processing system according to the embodiment.

First, the configuration of the information processing system according to the embodiment will be described with reference to FIG. 2. FIG. 2 is a view illustrating a configuration example of the information processing system according to the embodiment. The information processing system 1 may include the operator apparatuses 10, the administrator apparatus 20, and the information processing apparatus 100. The operator apparatuses 10, the administrator apparatus 20, and the information processing apparatus 100 may be connected so as to enable wired or wireless communication via a predetermined network N. Note that the information processing system 1 may include an arbitrary number of the operator apparatuses 10, an arbitrary number of the administrator apparatuses 20, and an arbitrary number of the information processing apparatuses 100.

The operator apparatus 10 is an information processing apparatus used by an operator. The operator apparatus 10 is, for example, a smartphone, a tablet terminal, a notebook Personal Computer (PC), a desktop PC, a mobile phone, a Personal Digital Assistant (PDA), a head mounted display, or the like. The embodiment will describe an example where the operator apparatus 10 is a notebook PC or a desktop PC (simply referred to as a PC below in some cases).

Note that, as illustrated in FIG. 2, the operator apparatuses 10 will be distinguished and described as operator apparatuses 10-1 to 10-N according to the operator who uses the operator apparatus 10 in some cases. For example, the operator apparatus 10-1 is the operator apparatus 10 used by an operator U1 identified based on an operator ID "U1". Furthermore, for example, the operator apparatus 10-2 is the operator apparatus 10 used by an operator U2 identified based on an operator ID "U2". Furthermore, in the following description, the operator apparatuses 10-1 to 10-N will be referred to as the operator apparatus 10 when described without being distinguished in particular.

The administrator apparatus 20 is an information processing apparatus used by an administrator who manages work of an operator. The administrator apparatus 20 is, for example, a smartphone, a tablet terminal, a notebook Personal Computer (PC), a desktop PC, a mobile phone, a Personal Digital Assistant (PDA), a head mounted display, or the like. The embodiment will describe an example where the administrator apparatus 20 is a notebook PC or a desktop PC (simply referred to as a PC below in some cases).

The information processing apparatus 100 is an information processing apparatus that executes the processing described with reference to FIG. 1. The information processing apparatus 100 accepts from the operator apparatus 10 selection areas of a plurality of images including ground truth images associated with ground truth selection areas every time the operator completes area selection processing on one image. Furthermore, when the images associated with the accepted selection areas are the ground truth images, the information processing apparatus 100 calculates an evaluation value indicating an evaluation on the operator based on the comparison between the accepted selection areas and the ground truth selection areas. Furthermore, the information processing apparatus 100 transmits information related to the calculated evaluation value to the administrator apparatus 20.

4. Configuration of Information Processing Apparatus

Figure 3:
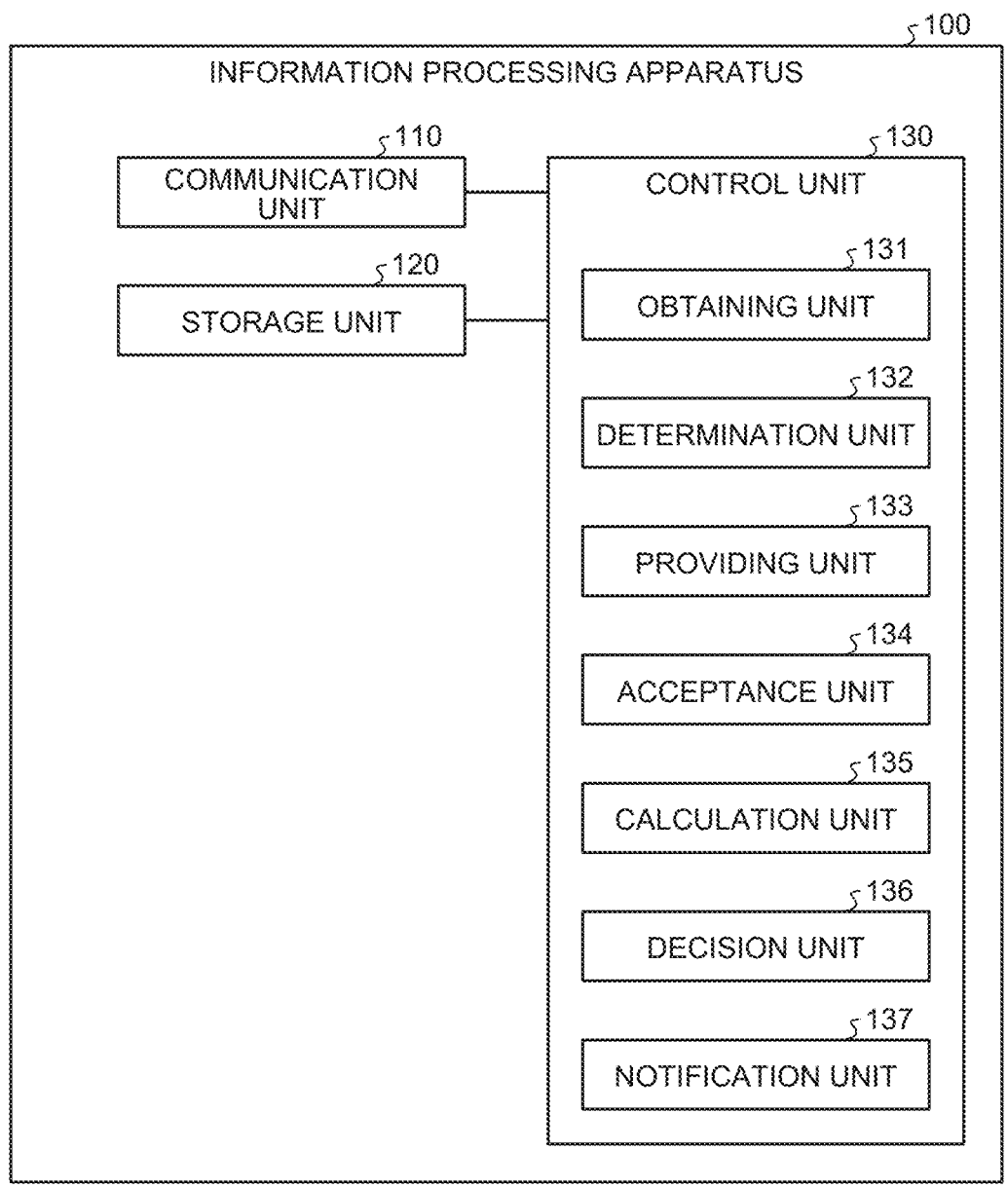
FIG. 3 is a view illustrating a configuration example of an information processing apparatus according to the embodiment.

Next, the configuration of the information processing apparatus 100 according to the embodiment will be described with reference to FIG. 3. FIG. 3 is a view illustrating a configuration example of the information processing apparatus 100 according to the embodiment. The information processing apparatus 100 may include a communication unit 110, a storage unit 120, and a control unit 130. Note that the information processing apparatus 100 may include an input unit (e.g., a keyboard, a mouse, or the like) that accepts various operations from an administrator or the like of the information processing apparatus 100, and a display unit (e.g., a liquid crystal display or the like) that displays various pieces of information.

(Communication Unit 110)

The communication unit 110 is realized by, for example, a Network Interface Card (NIC) or the like. Furthermore, the communication unit 110 is connected to the network by wired connection or wireless connection, and transmits and receives information between the operator apparatus 10 and the administrator apparatus 20, for example.

(Storage Unit 120)

The storage unit 120 is realized by, for example, a semiconductor memory element such as a Random Access Memory (RAM) or a flash memory, or a storage apparatus such as a hard disk or an optical disk. More specifically, the storage unit 120 associates and stores information that makes it possible to identify each of a plurality of processing targets, and each of the plurality of processing targets. For example, as an example of the processing targets, the storage unit 120 associates and stores information (e.g., image IDs) that makes it possible to identify each of the plurality of images, and each of the plurality of images. Furthermore, the storage unit 120 associates and stores the ground truth processing targets and the ground truth processing results. For example, as an example of the processing targets, the storage unit 120 associates and stores the ground truth selection areas selected by an annotation requester, and the ground truth images.

(Control Unit 130)

The control unit 130 is a controller, and is implemented when, for example, a Central Processing Unit (CPU), a Micro Processing Unit (MPU), or the like executes various programs (corresponding to an example of an information processing program) stored in the storage apparatus inside the information processing apparatus 100 using the RAM as a working area. Furthermore, the control unit 130 is a controller, and is realized by, for example, an integrated circuit such as an Application Specific Integrated Circuit (ASIC) or a Field Programmable Gate Array (FPGA).

The control unit 130 includes an obtaining unit 131, a determination unit 132, a providing unit 133, an acceptance unit 134, a calculation unit 135, a decision unit 136, and a notification unit 137 as functional units, and may implement or execute an action of information processing described below. Note that an internal configuration of the control unit 130 is not limited to the configuration illustrated in FIG. 2, and may be another configuration as long as the configuration is a configuration that performs information processing to be described later. Furthermore, each functional unit indicates the function of the control unit 130, and does not necessarily need to be physically distinguished.

(Obtaining Unit 131)

The obtaining unit 131 obtains a plurality of processing targets including ground truth processing targets associated with ground truth processing results. More specifically, the obtaining unit 131 obtains an annotation work target image as an example of a processing target. For example, the obtaining unit 131 obtains a plurality of images including the ground truth images associated with the ground truth selection areas selected by an annotation requester from the administrator apparatus used by the requester (administrator).

Furthermore, when obtaining a plurality of processing targets including the ground truth processing targets, the obtaining unit 131 associates and stores information that makes it possible to identify each of the plurality of processing targets and each of the plurality of processing targets in the storage unit 120. For example, when obtaining a plurality of images that are annotation work targets as an example of the processing targets, the obtaining unit 131 associates and stores information (e.g., the image IDs) that makes it possible to identify each of the plurality of images and each of the plurality of images in the storage unit 120.

Furthermore, when obtaining the ground truth processing targets, the obtaining unit 131 associates and stores the ground truth processing targets and the ground truth processing results in the storage unit 120. For example, when obtaining ground truth images associated with ground truth selection areas selected by the annotation requester as an example of the processing targets, the obtaining unit 131 associates and stores the ground truth images and the ground truth selection areas in the storage unit 120.

(Determination Unit 132)

The determination unit 132 determines an order for making the operator process the ground truth processing targets among the plurality of processing targets. More specifically, when the obtaining unit 131 obtains the plurality of processing targets, the determination unit 132 determines the order for making the operator process the ground truth processing targets among the plurality of processing targets obtained by the obtaining unit 131. For example, when the obtaining unit 131 obtains the plurality of images, the determination unit 132 determines the order for making the operator process the ground truth images among the plurality of images obtained by the obtaining unit 131.

More specifically, the determination unit 132 determines the order so as to make the operator process the ground truth processing targets for a plurality of processing targets at predetermined intervals. For example, the determination unit 132 determines the order so as to make the operator process the ground truth images for a plurality of images at predetermined intervals. In the example illustrated in FIG. 1, the determination unit 132 determines the order so as to make the operator process five ground truth images every 100 images of 500 images. That is, the determination unit 132 determines the order for making the operator process the ground truth images among the 500 images as the first, 101st, 201st, 301st, and 401st images.

Subsequently, when determining the order for making the operator process the ground truth processing targets, the determination unit 132 determines the order for making operator process other processing targets (also referred to as non-ground truth processing targets below) other than the ground truth processing targets among the plurality of processing targets obtained by the obtaining unit 131. For example, when determining the order for making the operator process the ground truth images, the determination unit 132 determines the order for making the operator process images (also referred to as non-ground truth images) other than the ground truth images among the plurality of images obtained by the obtaining unit 131. In the example illustrated in FIG. 1, when determining the order for making the operator process the five ground truth images, the determination unit 132 determines the order for making the operator process the rest of 495 non-ground truth images among the 500 images.

When determining the processing order of the plurality of processing targets, the determination unit 132 uploads the plurality of processing targets associated with the determined processing order to a shared server (e.g., a cloud server). For example, when determining the processing order of the plurality of images, the determination unit 132 uploads the plurality of images associated with the determined processing order to the shared server. In the example illustrated in FIG. 1, when determining the processing order of the 500 images accepted from the requester, the determination unit 132 uploads the 500 images associated with the determined processing order to the shared server.

(Providing Unit 133)

The providing unit 133 provides to the operator a work screen for the operator to process a plurality of processing targets. More specifically, the providing unit 133 causes the operator apparatus 10 to display the work screen for the operator to process a plurality of processing targets. More specifically, the providing unit 133 transmits, to the operator apparatus 10, content corresponding to the work screen for the operator to process the plurality of processing targets. For example, the providing unit 133 transmits, to the operator apparatus 10, content corresponding to the work screen for the operator to perform processing of selecting selection areas for a plurality of images. The operator apparatus 10 displays the work screen by displaying the content received from the information processing apparatus 100 on the screen. For example, the providing unit 133 displays the plurality of images one by one on the screen of the operator apparatus 10 in the processing order determined by the determination unit 132. For example, the providing unit 133 causes the operator apparatus 10 to display on the screen the content corresponding to the work screen illustrated in FIGS. 4 to 7 to be described later.

Furthermore, the providing unit 133 causes the operator apparatus 10 to display the work screen for processing the ground truth processing targets, and the work screen for processing the non-ground truth processing targets in a mode that these work screens cannot be visually distinguished. For example, the providing unit 133 causes the operator apparatus 10 to display the plurality of images one by one as the images displayed on the screen of the operator apparatus 10 on the screen in a mode that the ground truth images and the non-ground truth images cannot be visually distinguished.

Furthermore, the providing unit 133 provides to the administrator a management screen that displays a processing status of the operator. More specifically, the calculation unit 135 calculates a rate of the number of processing targets processed by each of the plurality of operators with respect to the number of the plurality of processing targets. The providing unit 133 provides the management screen that displays the rate of the number of processed processing targets of the operator calculated by the calculation unit 135 as an example of the processing status by the operator. For example, in a case where there are a plurality of operators, the providing unit 133 provides a management screen that displays a rate of the number of processed processing targets calculated by the calculation unit 135 for each of the plurality of operators.

Furthermore, the providing unit 133 also provides a management screen that displays a skill score of the operator. More specifically, the calculation unit 135 calculates a skill score that indicates a processing skill of each of the plurality of operators based on an evaluation value. For example, in a case where there are a plurality of operators, the providing unit 133 provides a management screen that displays a skill score of each of the plurality of operators. For example, the providing unit 133 transmits content corresponding to the management screen to the administrator apparatus 20. The administrator apparatus 20 displays the content received from the information processing apparatus 100 on the screen, and thereby displays the management screen.

Figure 12:
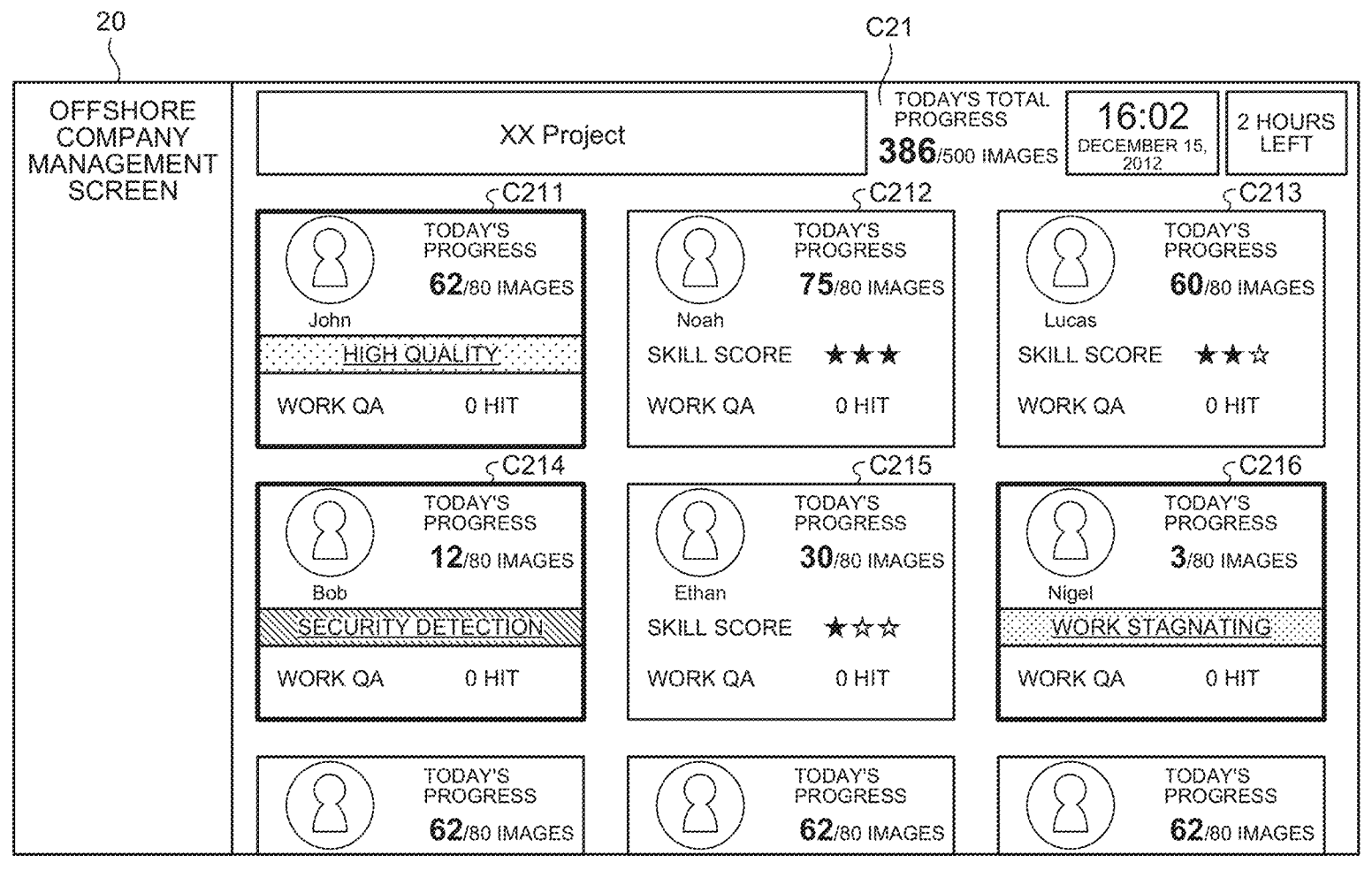
Figure 13:
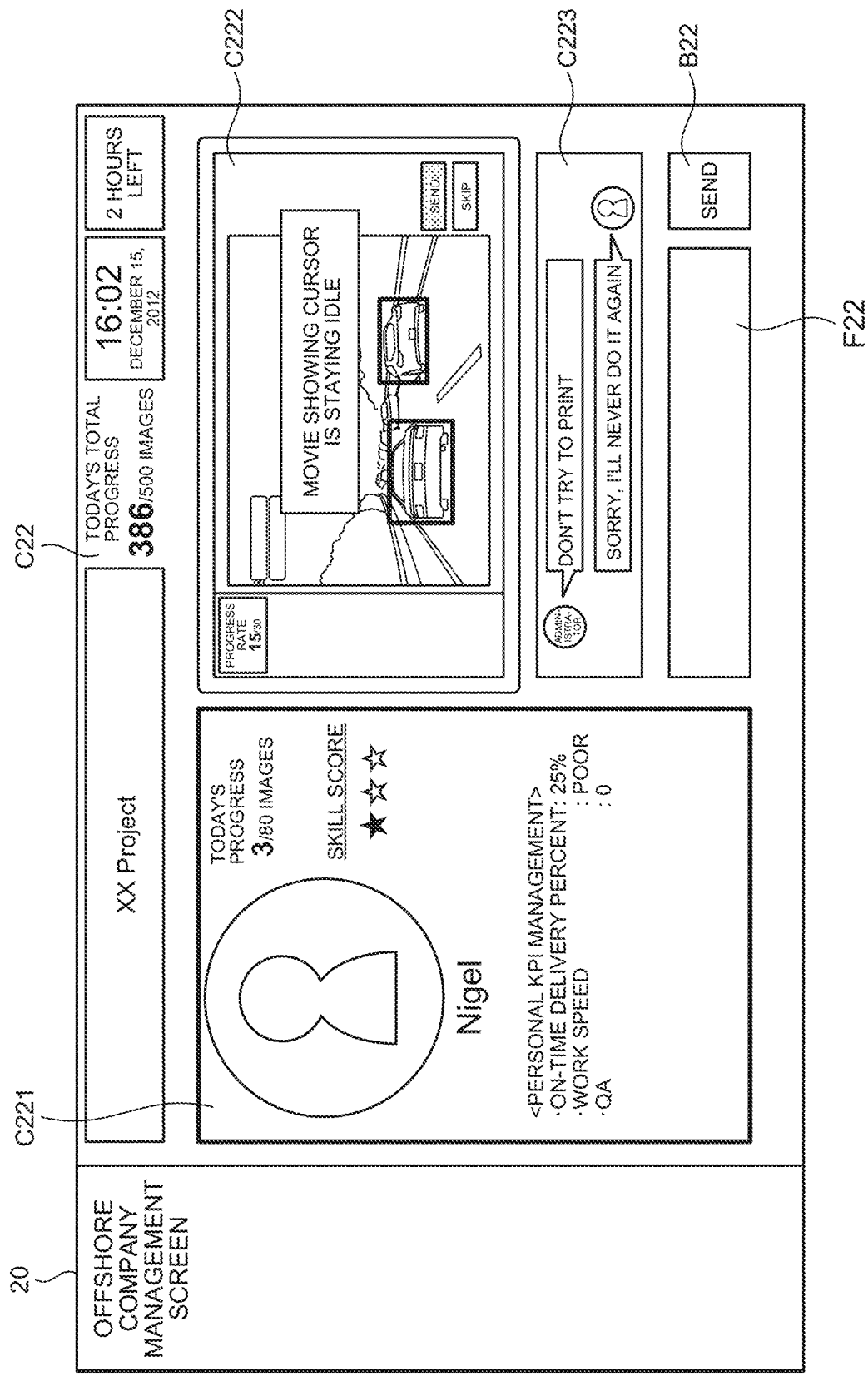
FIG. 13 is a view illustrating an example of the screen of the administrator apparatus according to the embodiment.

Hereinafter, the management screen provided by the providing unit 133 will be described in detail with reference to FIGS. 12 and 13. FIGS. 12 and 13 are views illustrating examples of a screen of the administrator apparatus according to the embodiment.

In the example illustrated in FIG. 12, the providing unit 133 transmits to the administrator apparatus content C21 including items of partial content C211 to C216 that display star marks indicating processing statuses (today's progresses) and skill scores of a plurality of respective operators in charge of creating training data for an XX project.

Furthermore, the providing unit 133 provides the content C21 including the partial content C211 including information for visually notifying the administrator of that quality of training data created by John who is an operator is high. For example, when words "high quality" displayed in the partial content C211 are selected by the administrator, the providing unit 133 provides the content C21 including the partial content C211 that makes it possible to transition to a screen that display a detailed processing status of John.

Furthermore, the providing unit 133 provides a management screen that includes information for visually notifying the administrator of an operator having an evaluation value lower than those of other operators among the plurality of operators. For example, as an example of the management screen that includes information for visually notifying the administrator of an operator having an evaluation value lower than those of other operators, the providing unit 133 provides, for example, the content C21 including the partial content C214 including information for visually notifying the administrator of that quality of training data created by Bob who is an operator has deteriorated. For example, when words "security detection" displayed in the partial content C214 are selected by the administrator, the providing unit 133 provides the content C21 including the partial content C214 that makes it possible to transition to a screen that displays a detailed processing status of Bob.

Furthermore, the providing unit 133 provides the content C21 including the partial content C216 including information for visually notifying the administrator of that annotation work of Nigel who is an operator stagnates. For example, when words "work stagnating" displayed in the partial content C216 are selected by the administrator, the providing unit 133 provides the content C21 including the partial content C216 that makes it possible to transition to a screen that displays a detailed processing status of Nigel.

Furthermore, the providing unit 133 provides the content C21 that displays the entire progress status of the XX project. For example, as an example of the entire progress status of the XX project, the providing unit 133 provides the content C21 indicating that 386 images of 500 images that need to be processed in the entire XX project have been processed. Furthermore, the providing unit 133 provides the content C21 that displays a remaining working time. For example, the providing unit 133 provides the content C21 that displays that the remaining working time of the XX project is two hours. When receiving the content C21, the administrator apparatus 20 displays the received content C21 on the screen.

In the example illustrated in FIG. 13, the providing unit 133 transmits to the administrator apparatus content C22 including partial content C221 that displays a detailed processing status of Nigel who is the operator. For example, when the words "work stagnating" displayed in the partial content C216 illustrated in FIG. 12 are selected by the administrator, the providing unit 133 transmits to the administrator apparatus 20 the content C22 corresponding to a screen that displays the detailed processing status of Nigel. When receiving the content C22, the administrator apparatus 20 displays the received content C22 on the screen.

Furthermore, the providing unit 133 provides the content C22 including the movie C222 that displays processing of Nigel who is the operator in real time. For example, the providing unit 133 provides the content C22 including the movie C222 showing that a cursor of Nigel who is the operator is staying idle.

Furthermore, the providing unit 133 provides the content C22 including an area C223 that makes it possible to exchange messages between the administrator and Nigel who is the operator through the screen. For example, the providing unit 133 provides the content C22 including an area F22 in which a message can be input, and a send button B22 of a message. Furthermore, the providing unit 133 provides the content C22 including the area C223 that displays a Nigel's reply message "Sorry, I'll never do it again" to an administrator's message "Don't try to print".

(Acceptance Unit 134)

The acceptance unit 134 accepts processing results of a plurality of processing targets including ground truth processing targets associated with the ground truth processing results from the operator apparatus 10 every time the operator completes processing on part of the processing targets. More specifically, the acceptance unit 134 accepts selection areas of the plurality of images including the ground truth images associated with the ground truth selection areas from the operator apparatus 10 every time the operator completes area selection processing on one image. More specifically, the acceptance unit 134 accepts the processing result of the selection processing by the operator from the operator apparatus 10 through the work screen provided by the providing unit 133 every time the operator completes the area selection processing on one image.

Furthermore, the acceptance unit 134 accepts from the operator apparatus 10 the processing results of the plurality of processing targets including the ground truth processing targets in the order determined by the determination unit 132. More specifically, the acceptance unit 134 accepts from the operator apparatus 10 the processing results of the selection processing of the plurality of images including the ground truth images in the order determined by the determination unit 132. More specifically, the providing unit 133 transmits to the operator apparatus 10 the work screen including the images of the processing order determined by the determination unit 132 one by one in the order determined by the determination unit 132. Furthermore, the acceptance unit 134 accepts from the operator apparatus 10 the processing result of the selection processing by the operator through the work screen provided by the providing unit 133 every time the operator completes the area selection processing on one image. Thus, the acceptance unit 134 accepts from the operator apparatus 10 the processing results of the selection processing on the images in the order determined by the determination unit 132.

Hereinafter, processing where the acceptance unit 134 accepts processing results of selection processing of images from the operator apparatus 10 will be described in detail with reference to FIGS. 4 to 7. FIGS. 4 to 7 are views illustrating an example of a screen of the operator apparatus 10 according to the embodiment.

Figure 4:
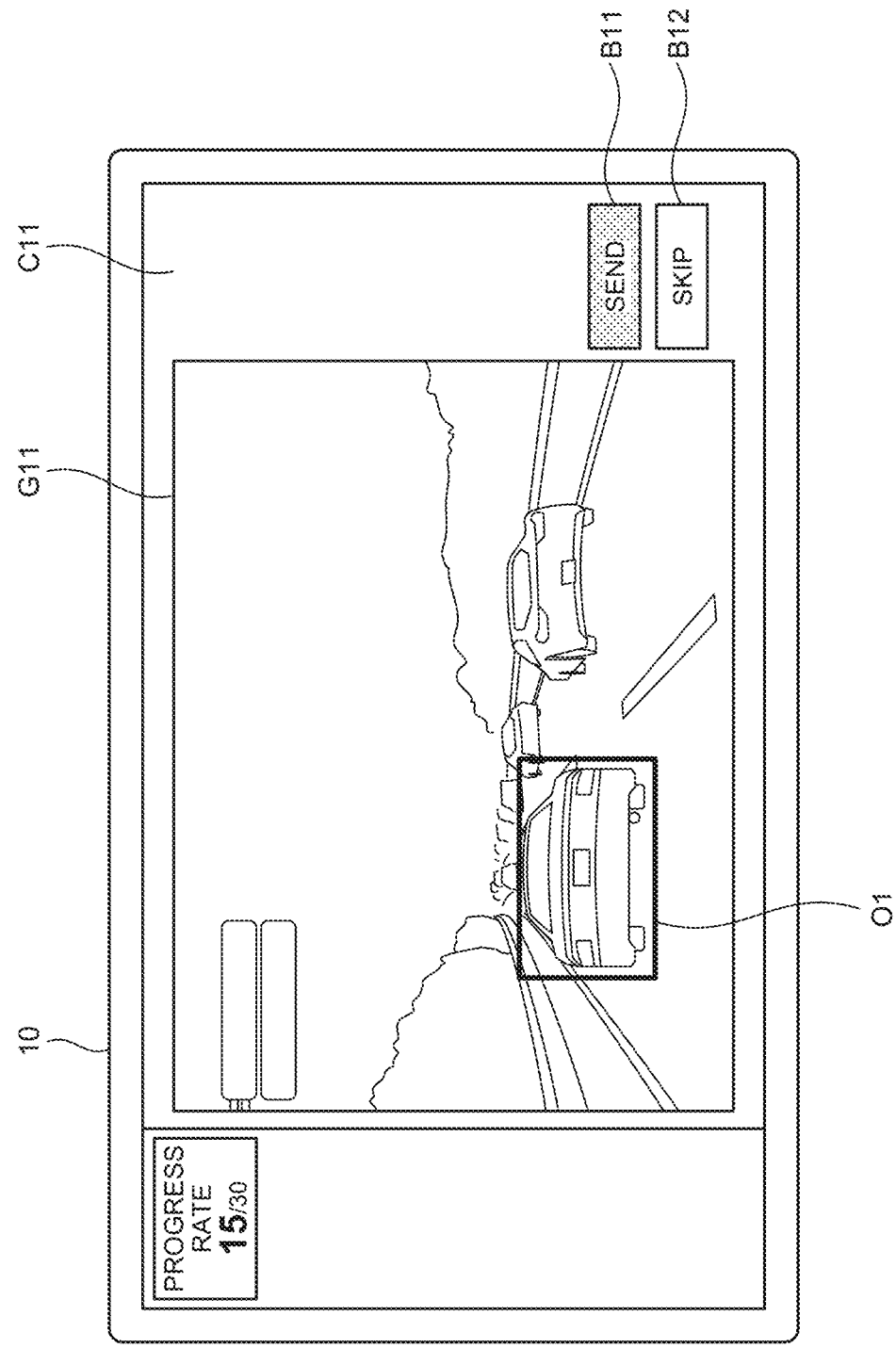
FIG. 4 is a view illustrating an example of a screen of an operator apparatus according to the embodiment.

In the example illustrated in FIG. 4, the providing unit 133 transmits to the operator apparatus 10 content C11 corresponding to a work screen including an image G11 whose processing order determined by the determination unit 132 is fifteenth. When receiving the content C11, the operator apparatus 10 displays the received content C11 on the screen. The operator apparatus accepts selection processing where the operator selects an area O1 where a car is captured, from the image G11 according to the operator's operation. Subsequently, the operator apparatus 10 accepts the selection operation of a send button B11 included in the content C11 according to the operator's operation. When accepting the selection operation of the send button B11, the operator apparatus 10 transmits information related to the selection area O1 selected by the operator to the information processing apparatus 100. The acceptance unit 134 accepts, from the operator apparatus 10, the selection area O1 that is the processing result of the selection processing performed on the image G11 by the operator.

Figure 5:
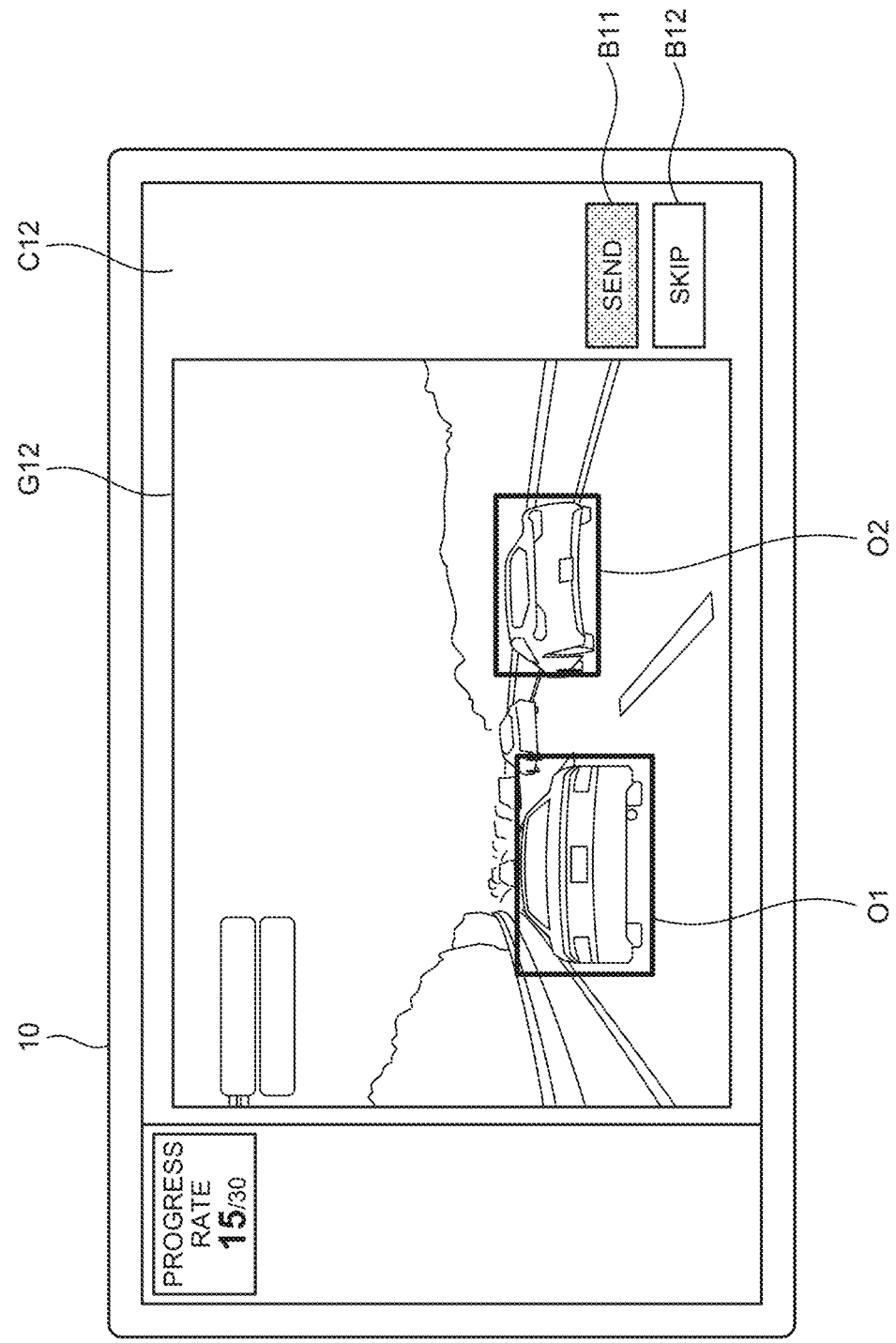
FIG. 5 is a view illustrating an example of the screen of the operator apparatus according to the embodiment.

In the example illustrated in FIG. 5, the operator apparatus 10 accepts selection processing where the operator selects an area O2 where another car different from the car included in the selection area O1 is captured, from an image G12 according to the operator's operation. Subsequently, the operator apparatus 10 accepts a selection operation of a skip button B12 included in content C12 including the image G12 according to the operator's operation. In this regard, the skip button B12 is a button used by the operator to skip selection processing of a selection area for some reason. When accepting the selection operation of the skip button B12, the operator apparatus 10 transmits information related to skipping of the selection processing of the selection area O2 by the operator to the information processing apparatus 100. The acceptance unit 134 accepts from the operator apparatus 10 information related to skipping of the selection processing of the selection area O2 by the operator.

Figure 6:
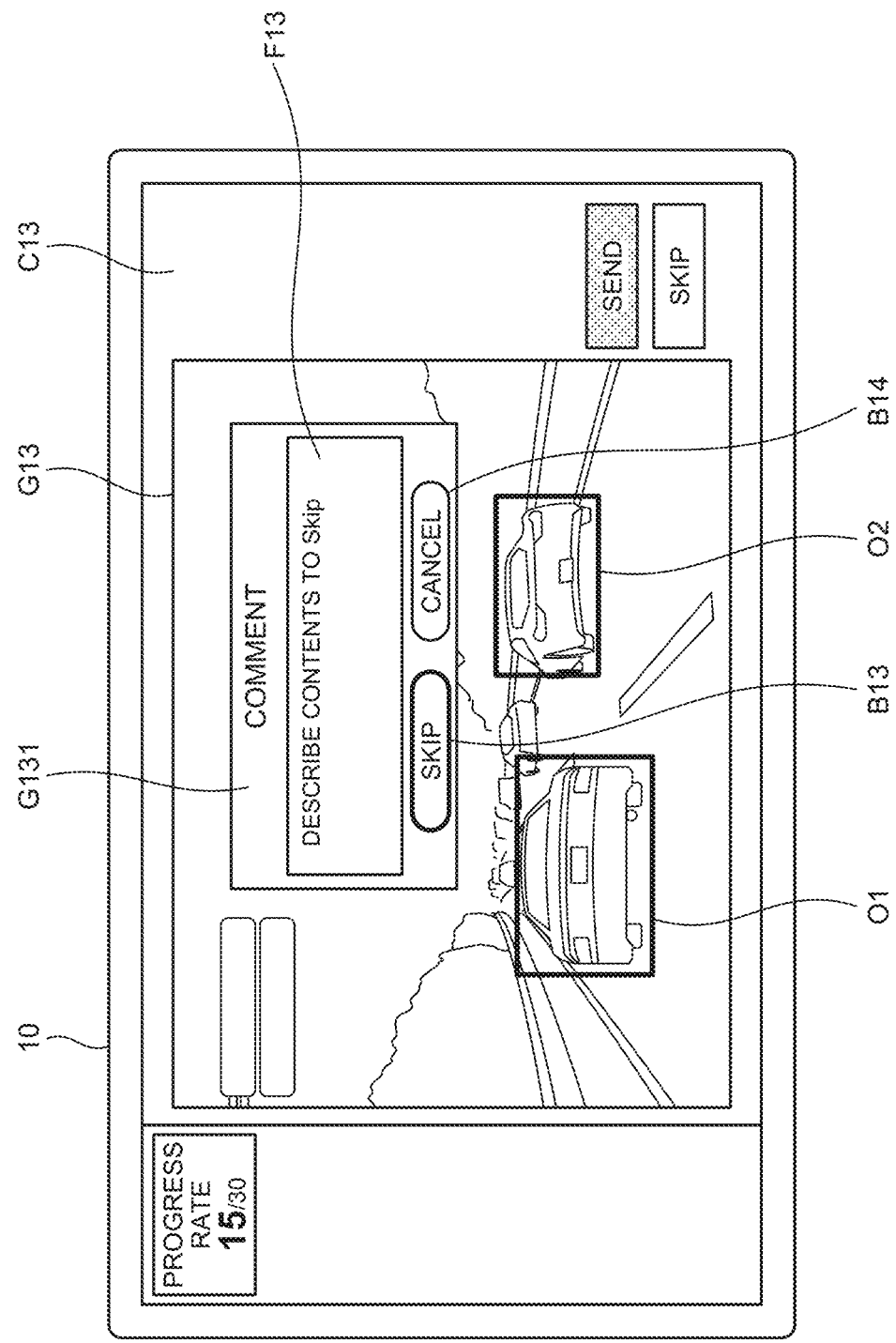
FIG. 6 is a view illustrating an example of the screen of the operator apparatus according to the embodiment.

In the example illustrated in FIG. 6, when the acceptance unit 134 accepts the information related to skipping of the selection processing of the selection area O2, the providing unit 133 transmits, to the operator apparatus 10, content C13 corresponding to a work screen that displays partial content G131 including a field F13 in which the operator can input a text of a reason to skip the selection processing of the selection area O2. In this regard, the partial content G131 includes a skip button B13 for transmitting the text input in the field F13 to the information processing apparatus 100, and a cancel button B14 for not transmitting the text input in the field F13 to the information processing apparatus 100.

Figure 7:
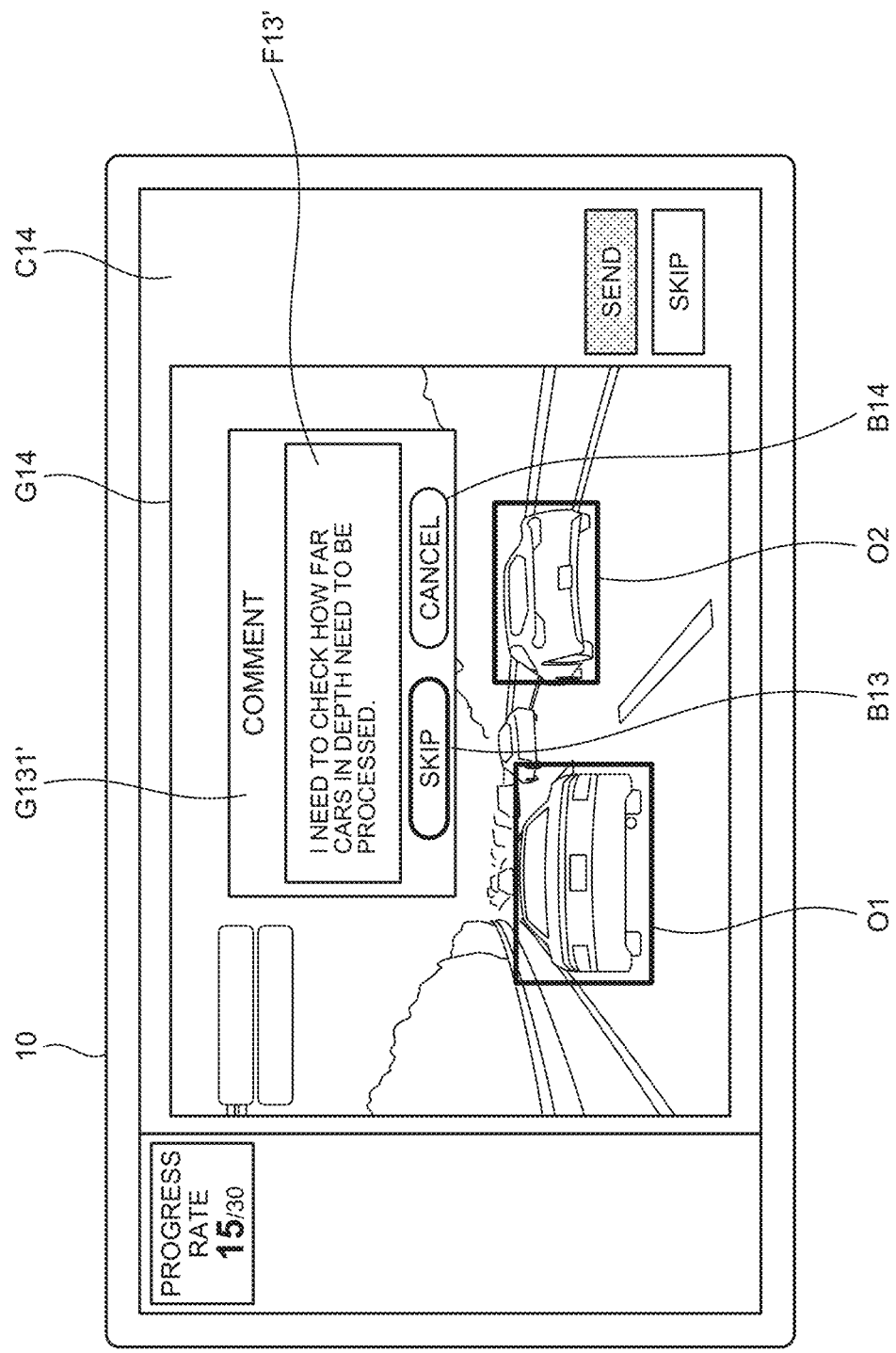
FIG. 7 is a view illustrating an example of the screen of the operator apparatus according to the embodiment.

Subsequently, in FIG. 7, the operator apparatus accepts an operator's operation of inputting to the field F13' a text indicating the reason to skip the selection processing of the selection area O2 according to the operator's operation. In FIG. 7, the operator apparatus 10 accepts the input operation of the text "I need to check how far cars in depth need to be processed.". Subsequently, the operator apparatus 10 accepts the selection operation of the skip button B13 included in the partial content G131 according to the operator's operation. When accepting the selection operation of the skip button B13, the operator apparatus 10 transmits the text input by the operator to the information processing apparatus 100. The acceptance unit 134 accepts the text input by the operator from the operator apparatus 10. When the acceptance unit 134 accepts the text, the notification unit 137 associates information related to the text accepted by the acceptance unit 134 with an operator ID to transmit to the administrator apparatus 20.

Figure 8:
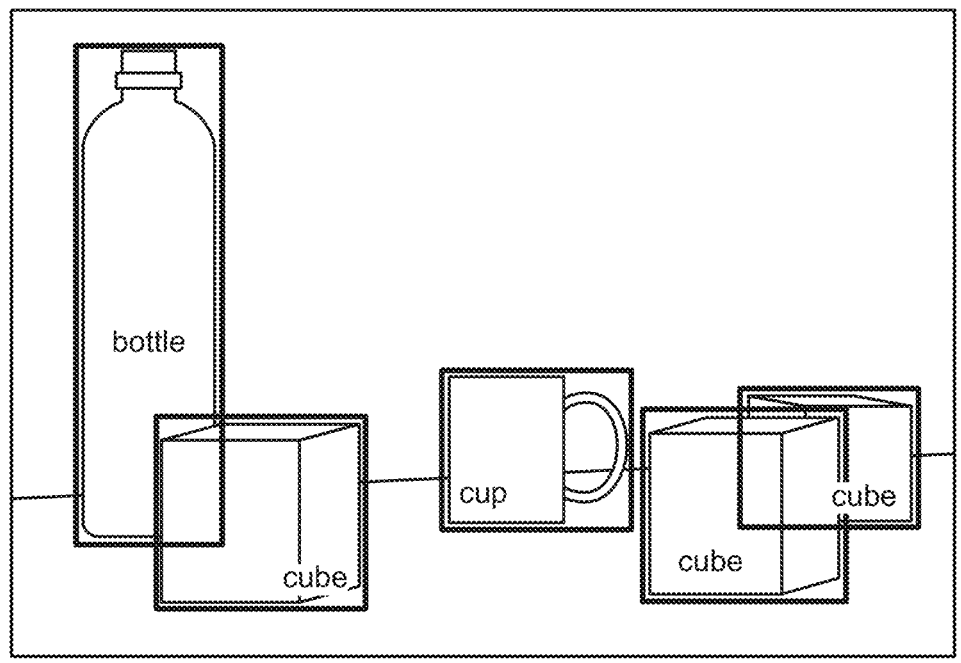
FIG. 8 is a view illustrating an example of annotation according to the embodiment.

Hereinafter, annotation according to the embodiment will be described in more detail with reference to FIG. 8. FIG. 8 is a view illustrating an example of annotation according to the embodiment. In the example illustrated in FIG. 8, an image includes a plurality of objects such as a "bottle", a "cup", and three "cubes". At this time, annotation work is performed by the operator by manually selecting each of five bounding boxes surrounding each of areas where the "bottle", the "cup", and the three "cubes" included in the image are captured. At this time, the acceptance unit 134 accepts from the operator apparatus the five bounding boxes associated with the "bottle", the "cup", and the three "cubes" selected by the operator. Note that training data generated by annotation performed by selecting the bounding box as illustrated in FIG. 8 is used for, for example, learning of a machine learning model that performs a plurality of types of object detection (object detection) included in the image.

Note that, although the above-described example has described the example where the acceptance unit 134 accepts the processing results of the plurality of processing targets including the ground truth processing targets, the present invention is not limited thereto. More specifically, the acceptance unit 134 may further accept the processing results of the plurality of processing targets that do not include the ground truth processing targets every time the operator completes the processing on part of the processing targets.

(Calculation Unit 135)

When the processing targets associated with the processing results accepted by the acceptance unit 134 are the ground truth processing targets, the calculation unit 135 calculates an evaluation value indicating an evaluation on the operator based on comparison between the processing results accepted by the acceptance unit 134 and the ground truth processing results. More specifically, when the acceptance unit 134 accepts the processing results, the calculation unit 135 refers to the storage unit 120, and specifies processing targets associated with the processing results. Subsequently, when specifying the processing targets associated with the processing results, the calculation unit 135 decides whether or not the specified processing targets are the ground truth processing targets. For example, the calculation unit 135 refers to the storage unit 120, and decides whether there are the ground truth processing results associated with the specified processing targets. When deciding that there are the ground truth processing results associated with the specified processing targets, the calculation unit 135 decides that the specified processing targets are the ground truth processing targets. Subsequently, when deciding that the processing targets associated with the processing results accepted by the acceptance unit 134 are the ground truth processing targets, the calculation unit 135 refers to the storage unit 120, and obtains information related to the ground truth processing results associated with the ground truth processing targets. Subsequently, when obtaining the information related to the ground truth processing results, the calculation unit 135 calculates the evaluation value indicating the evaluation on the operator based on comparison between comparison between the obtained ground truth processing results and the processing results accepted by the acceptance unit 134.

More specifically, the calculation unit 135 calculates the degree of overlap (matching degree) between the processing results accepted by the acceptance unit 134 and the ground truth processing results as an example of the evaluation value based on comparison between the processing results accepted by the acceptance unit 134 and the ground truth processing results. For example, when an image associated with a selection area accepted by the acceptance unit 134 is a ground truth image, the calculation unit 135 calculates an evaluation value indicating the evaluation on the operator based on comparison between the selection area accepted by the acceptance unit 134 and the ground truth selection area. For example, the calculation unit 135 calculates the degree of overlap (matching degree) between the selection area accepted by the acceptance unit 134 and the ground truth selection area as an example of the evaluation value based on comparison between the selection area accepted by the acceptance unit 134 and the ground truth selection area.

For example, the calculation unit 135 calculates an Intersection over Union (IoU) that is a value obtained by dividing an area of a common part (intersection) of the selection area accepted by the acceptance unit 134 and the ground truth selection area by an area of a sum of sets (union) of the selection area accepted by the acceptance unit 134 and the ground truth selection area. Here, the IoU is used as an evaluation index of object detection. For example, when the selection area accepted by the acceptance unit 134 and the ground truth selection area exactly overlap (match), an IoU value is 1. On the other hand, when the selection area accepted by the acceptance unit 134 and the ground truth selection area do not overlap at all, the IoU value is 0. That is, it can be said that, as the IoU value is lager, object detection can be performed better. That is, it can be said that, as the IoU value calculated by the calculation unit 135 is larger, quality of object detection by the operator is higher. Therefore, as the IoU value calculated by the calculation unit 135 is larger, the evaluation on the operator is higher.

Although the above-described example has described the example where the calculation unit 135 calculates the evaluation value indicating the evaluation on the operator based on comparison between the processing results accepted by the acceptance unit 134 and the ground truth processing results, the present invention is not limited thereto. More specifically, the calculation unit 135 may calculate the evaluation value indicating the evaluation on the operator based on processing results of a plurality of processing targets that do not include the ground truth processing targets accepted by the acceptance unit 134. For example, based on the processing results of the plurality of processing targets that do not include the ground truth processing targets accepted by the acceptance unit 134, the calculation unit 135 calculates another evaluation value indicating an evaluation other than the evaluation that is based on the comparison with the ground truth processing results. For example, the calculation unit 135 may calculate a processing speed at which the operator processes a plurality of processing targets as an example of the another evaluation value. For example, the calculation unit 135 calculates as the processing speed a value obtained by dividing the number of the plurality of processing targets processed by the operator by a time required for processing by the operator.

(Decision Unit 136)

The decision unit 136 decides whether the quality of the processing results has deteriorated based on the evaluation value calculated by the calculation unit 135. More specifically, when the evaluation value calculated by the calculation unit 135 goes below the evaluation threshold, the decision unit 136 decides that the quality of the processing result has deteriorated. For example, when the IoU value calculated by the calculation unit 135 goes below the evaluation threshold, the decision unit 136 decides that the quality of the processing results has deteriorated.

(Notification Unit 137)

Figure 14:
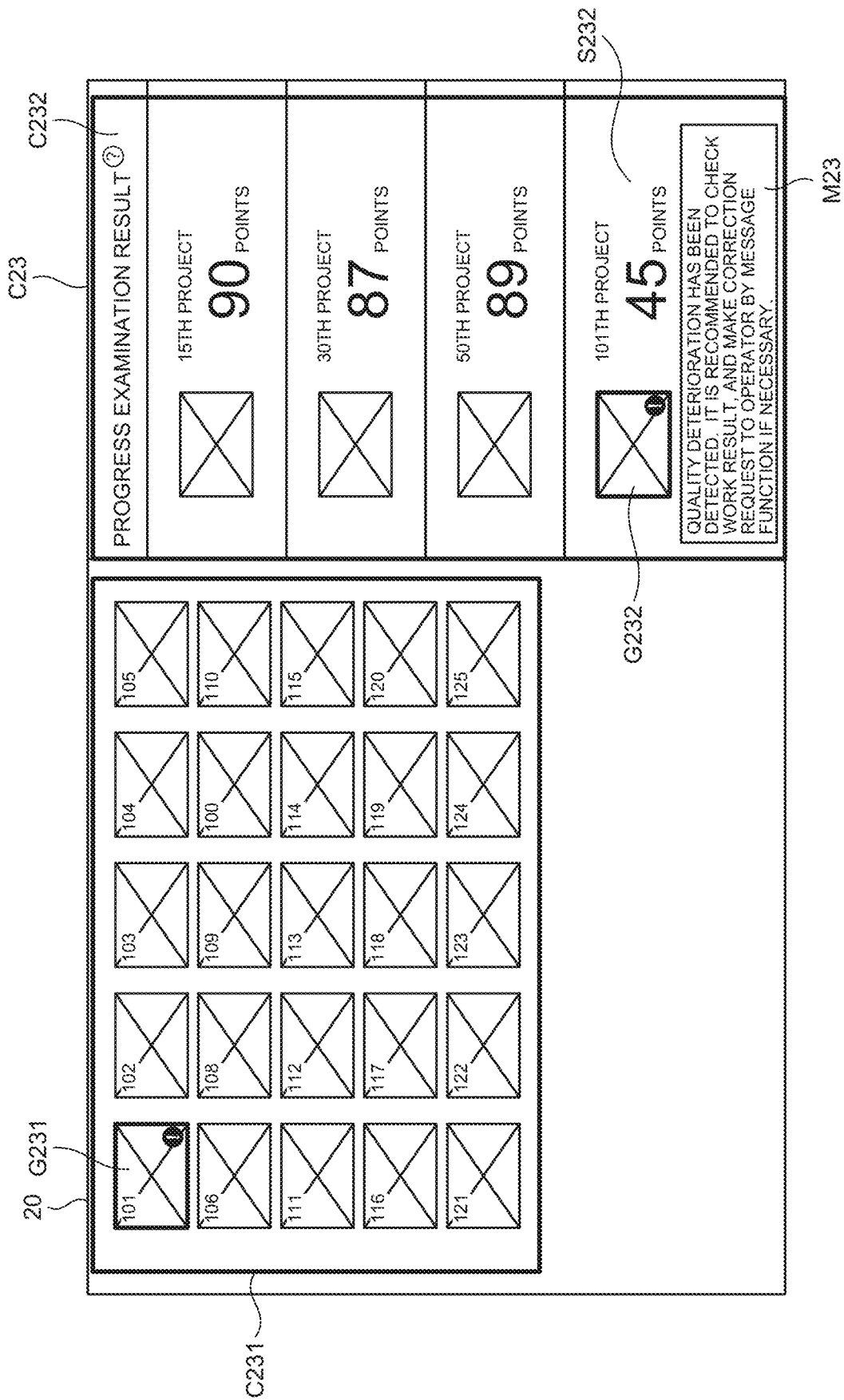
FIG. 14 is a view illustrating an example of the screen of the administrator apparatus according to the embodiment.
Figure 15:
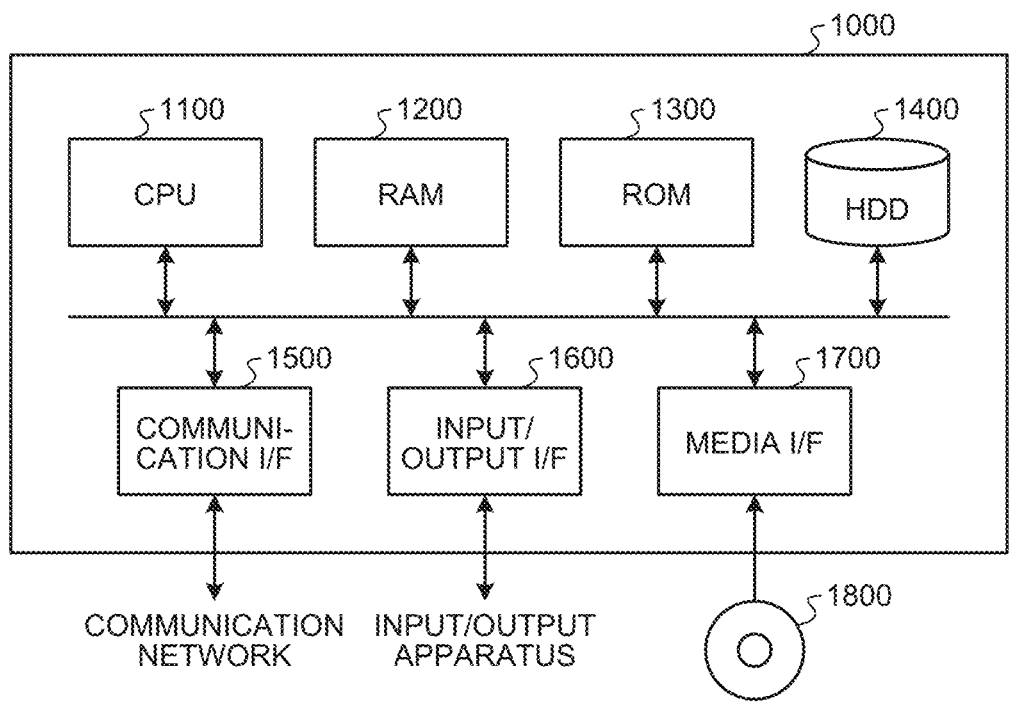
FIG. 15 is a hardware configuration diagram illustrating an example of a computer that implements functions of the information processing apparatus.

The notification unit 137 gives a notification of an alert to the administrator who manages operators' work. More specifically, the notification unit 137 notifies the administrator of the alert when the decision unit 136 decides that the quality has deteriorated. Alert notification processing of the notification unit 137 will be described in detail with reference to FIG. 14. FIG. 14 is a view illustrating an example of the screen of the administrator apparatus according to the embodiment.

In FIG. 14, the decision unit 136 decides that the quality of the processing results has deteriorated when the IoU value calculated by the calculation unit 135 goes below 50 points that are an evaluation threshold. For example, the calculation unit 135 calculates the IoU value related to the 101st image as 45 points. The IoU value calculated by the calculation unit 135 goes below 50 points that are the evaluation threshold, and therefore the decision unit 136 decides that the quality of the annotation by the operator has deteriorated. The decision unit 136 decides that the quality has deteriorated, and therefore the notification unit 137 notifies the administrator of the alert. In the example illustrated in FIG. 14, the notification unit 137 transmits to the administrator apparatus 20 content C23 including partial content C231 including an image G231 that displays a surprise mark for giving a notification of quality deterioration at a lower right of a thumbnail of the 101st image. Furthermore, the notification unit 137 transmits to the administrator apparatus 20 the content C23 including the partial content C232 including an evaluation value S232 on the 101st image, the image G232 that displays the surprise mark for giving the notification of the quality deterioration at the lower right of the thumbnail of the 101st image, and a message M23 related to detection of the quality deterioration. When receiving the content C23, the administrator apparatus 20 displays the received content C23 on the screen.

5. Modified Example

The information processing system 1 according to the above-described embodiment may be implemented in various different modes other than the above-described embodiment. Therefore, another embodiment of the information processing system 1 will be described below. The same components as those in the embodiment will be assigned the same reference numerals, and the description thereof will be omitted.

[5-1. Processing Order for Ground Truth Processing Target]

Although the above-described embodiment has described the example where the determination unit 132 determines the order such that the operator processes the ground truth processing targets for the plurality of processing targets at the predetermined intervals, the processing order of the ground truth processing targets is not limited thereto.

More specifically, the determination unit 132 determines to make the number of ground truth processing targets larger as the order of processing by the operator is earlier. More specifically, the determination unit 132 determines to make the number of ground truth processing targets larger in a case where the order of processing by the operator is the first threshold or less than in a case where the order of processing by the operator exceeds the first threshold. Consequently, the information processing apparatus 100 can check whether or not the processing results of the operator and the ground truth processing results of the requester contradict at an early stage of the processing on the plurality of processing targets.

Furthermore, the determination unit 132 determines to make the number of ground truth processing targets larger as the order of the processing by the operator is later. More specifically, the determination unit 132 determines to make the number of ground truth processing targets larger in a case where the order of the processing by the operator is the second threshold or more than in a case where the order of the processing by the operator goes below the second threshold. Consequently, for example, the information processing apparatus 100 can appropriately detect deterioration of quality due to fatigue of the operator by including more ground truth processing targets in a second half of the plurality of processing targets that the operator gets tired of processing than in the first half of the plurality of processing targets.

Furthermore, the determination unit 132 dynamically determines the order for making the operator process the ground truth processing targets based on statistical information of evaluation values calculated by the calculation unit 135. More specifically, based on a transition of the evaluation value as the statistical information, the determination unit 132 determines to make the number of ground truth processing targets larger in a case where the evaluation value goes below a third threshold than in a case before the evaluation value goes below the third threshold. For example, the determination unit 132 determines the different third threshold per operator based on the different transition of the evaluation value per operator. Subsequently, according to the different third threshold per operator, the determination unit 132 determines to make the number of ground truth processing targets larger in a case where the evaluation value goes below the third threshold than in a case before the evaluation value goes below the third threshold. Consequently, by, for example, analyzing a trend of deterioration of quality per operator based on the transition of the evaluation value and determining the third threshold, the information processing apparatus 100 can appropriately detect the deterioration of the quality per operator.

Furthermore, based on the transition of the evaluation value as the statistical information, the determination unit 132 determines to make the number of ground truth processing targets larger in a case where the evaluation value indicates a deterioration trend than in a case before the evaluation value indicates the deterioration trend. Consequently, by, for example, including more ground truth processing targets after the evaluation value indicates the deterioration trend than before the evaluation value indicates the deterioration trend, the information processing apparatus 100 can stop deterioration of quality.

Furthermore, the determination unit 132 determines the number of ground truth processing targets larger to be included with respect to the number of the plurality of processing targets based on the evaluation value calculated by the calculation unit 135. For example, based on evaluation values of the plurality of operators, the determination unit 132 determines to make the number of the ground truth processing targets to be included with respect to the number of the plurality of processing targets larger for an operator having an evaluation value lower than those of other operators. Consequently, the information processing apparatus 100 can save time and effort to prepare many ground truth processing targets that take time and effort to create, and efficiently distribute a limited number of ground truth processing targets.

Furthermore, the acceptance unit 134 accepts a processing result of the same processing target from each of a plurality of operators. The calculation unit 135 calculates a lower evaluation value for the operator who has processed a processing result indicating a trend different from those of the processing results accepted from other operators of the plurality of operators than evaluation values of the other operators. Consequently, the information processing apparatus 100 can evaluate work contents of the operator even for the non-ground truth processing target. Consequently, the information processing apparatus 100 can save time and effort to prepare many ground truth processing targets that take time and effort to create, and efficiently distribute a limited number of ground truth processing targets.

[5-2. Types of Training Data]

Although the above-described embodiment has described the example where the information processing apparatus 100 evaluates quality of training data of the machine learning model that performs object detection among the image recognition technologies, the type of training data evaluated by the information processing apparatus 100 is not limited thereto. More specifically, the above-described processing target may be a text or a voice in addition to an image according to use of the machine learning model.

[5-3. Type of Annotation]

Figure 9:
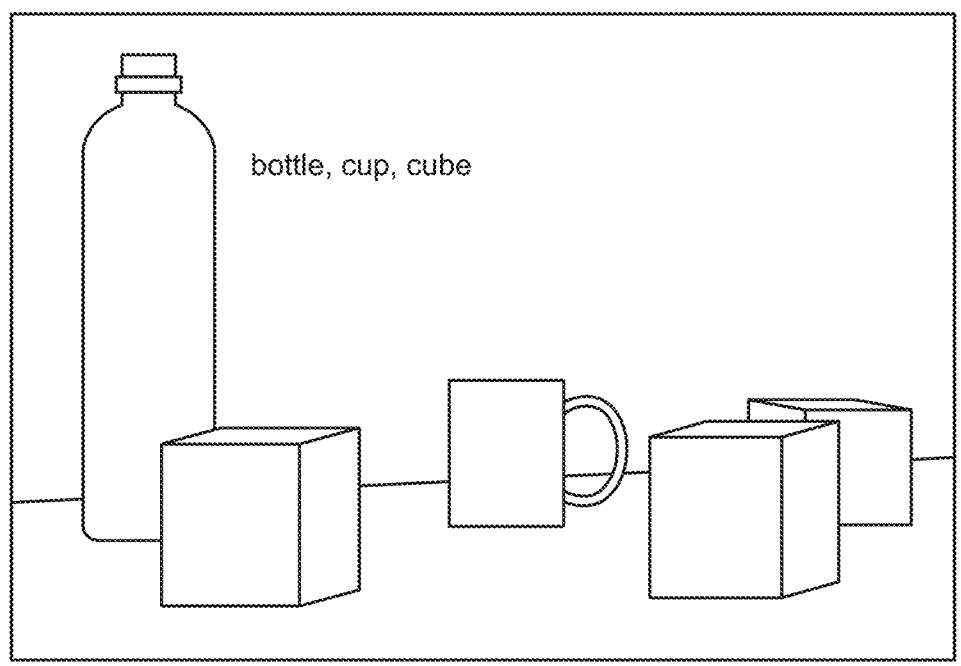
FIG. 9 is a view illustrating an example of annotation according to a modified example.
Figure 10:
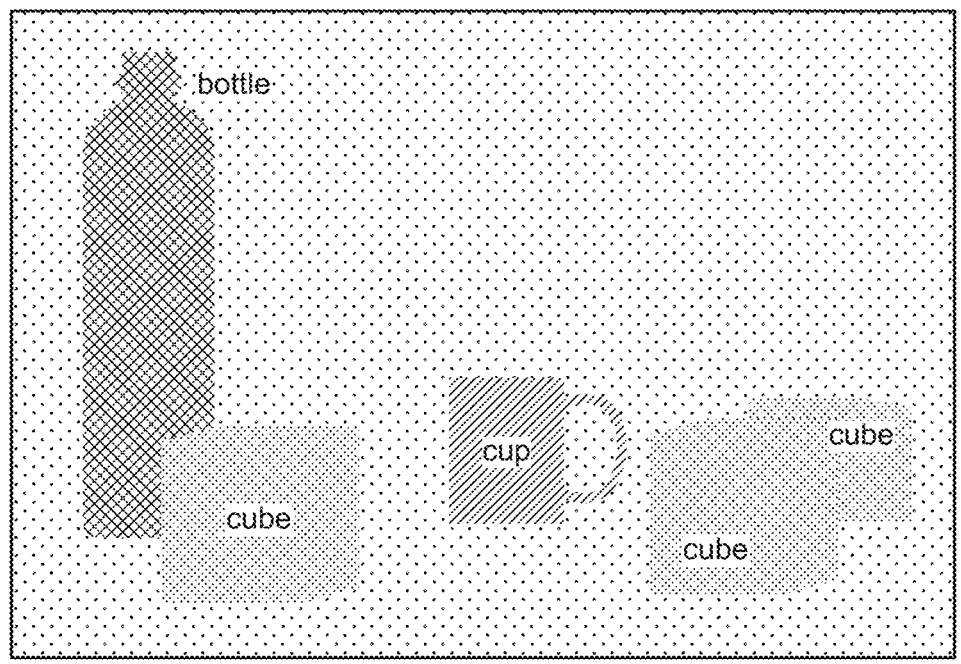
FIG. 10 is a view illustrating an example of annotation according to the modified example.
Figure 11:
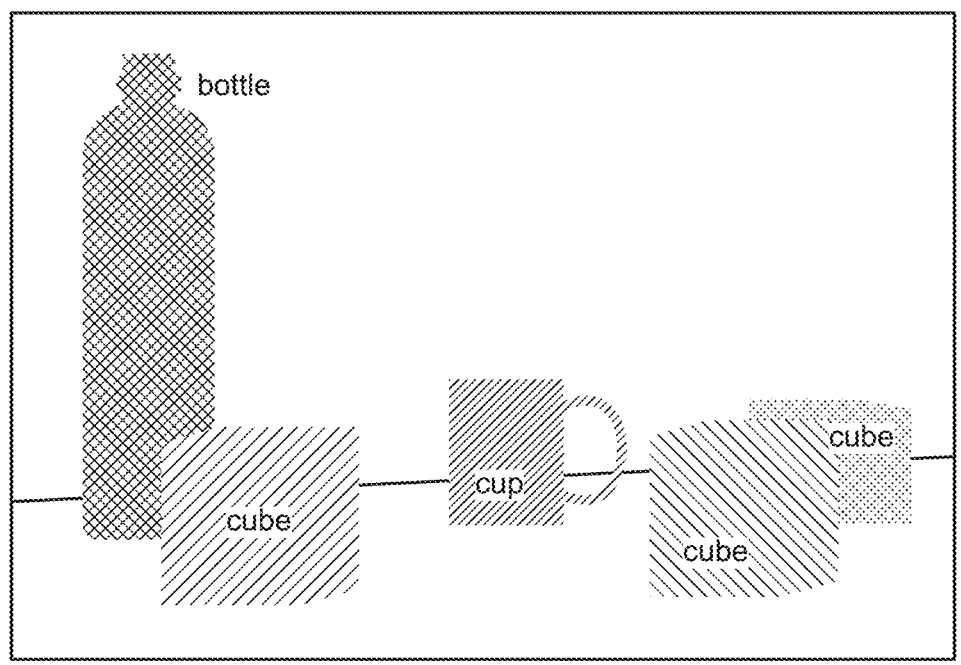
FIG. 11 is a view illustrating another example of the annotation according to the modified example.

Although the above-described embodiment has described the example where the information processing apparatus 100 evaluates quality of training data created by annotation performed by selecting the bounding boxes illustrated in FIG. 8, the quality of the training data created by annotation of other types may be evaluated. Hereinafter, the type of annotation will be described in detail with reference to FIGS. 9 to 11. FIGS. 9 to 11 are views illustrating examples of annotation according to the modified example. The information processing apparatus 100 may evaluate the quality of the training data created by the annotation illustrated in FIGS. 9 to 11.

In the example illustrated in FIG. 9, an image includes a plurality of objects such as a "bottle", a "cup", and three "cubes". At this time, the annotation work is performed by the operator by manually giving, to the image, labels indicating object types such as the "bottle", the "cup", and the "cubes" included in the image. At this time, the acceptance unit 134 accepts from the operator apparatus 10 three labels corresponding to the "bottle", the "cup", and the "cubes" given by the operator. Note that the training data generated by the annotation of giving the labels as illustrated in FIG. 9 is used for, for example, learning of the machine learning model that performs image classification for classifying images into classes associated with the label.

In the example illustrated in FIG. 10, an image includes a plurality of objects such as a "bottle", a "cup", and three "cubes". At this time, annotation work is performed by the operator by classifying areas where the "bottle", the "cup", and the three "cubes" included in the image are captured, into three types of the "bottle", the "cup", and the "cubes" by colors per object type, and filling the areas with the colors. At this time, the acceptance unit 134 accepts, from the operator apparatus 10, the areas classified into the three types by the colors and filled with the colors by the operator. Note that training data generated by annotation performed by classifying areas by colors per object type as illustrated in FIG. 10 is used for, for example, learning of a machine learning model that performs semantic segmentation that classifies all pixels in an image into classes.

In the example illustrated in FIG. 11, an image includes a plurality of objects such as a "bottle", a "cup", and three "cubes". At this time, annotation work is performed by the operator by classifying areas where the "bottle", the "cup", and the three "cubes" included in the image are captured, into five types by colors per object type, and filling the areas with the colors. At this time, the acceptance unit 134 accepts, from the operator apparatus 10, the areas classified into the five types by the colors and filled with the colors by the operator. Note that training data generated by annotation performed by classifying areas by colors per object type as illustrated in FIG. 11 is used for, for example, learning of a machine learning model that performs instant segmentation that classifies each pixel in an image per object.

6. Effect

As described above, the information processing apparatus 100 according to the embodiment includes the acceptance unit 134 and the calculation unit 135. The acceptance unit 134 accepts processing results of a plurality of processing targets including ground truth processing targets associated with ground truth processing results every time the operator completes processing on part of the processing targets. When the processing targets associated with the processing results accepted by the acceptance unit 134 are the ground truth processing targets, the calculation unit 135 calculates an evaluation value indicating an evaluation on the operator based on comparison between the processing results accepted by the acceptance unit 134 and the ground truth processing results.

Thus, the information processing apparatus 100 performs progress examination based on comparison between the processing results of the operator and the ground truth processing targets in the middle of the processing manually performed on the plurality of processing targets. Consequently, by periodically evaluating the quality on a regular basis, the information processing apparatus 100 can immediately detect deterioration of quality when the quality deteriorates, and consequently prevent deterioration of overall quality in advance. Therefore, the information processing apparatus 100 can ensure quality of results of processing such as annotation manually performed on a plurality of processing targets.

Furthermore, the information processing apparatus 100 further includes the determination unit 132. The determination unit 132 determines an order for making the operator process the ground truth processing targets among the plurality of processing targets. The acceptance unit 134 accepts processing results of the plurality of processing targets including the ground truth processing targets in the order determined by the determination unit 132. When the processing targets associated with the processing results accepted by the acceptance unit 134 are the ground truth processing targets, the calculation unit 135 calculates an evaluation value indicating an evaluation on the operator.

Consequently, the information processing apparatus 100 can flexibly determine the order for making the operator process the ground truth processing targets according to the operator or the type of the processing target, and consequently more appropriately detect degradation of quality according to the operator or the type of the processing target.

Furthermore, the determination unit 132 determines to make the number of ground truth processing targets larger as the order of the processing by the operator is earlier. More specifically, the determination unit 132 determines to make the number of ground truth processing targets larger in a case where the order of processing by the operator is the first threshold or less than in a case where the order of processing by the operator exceeds the first threshold.

Consequently, the information processing apparatus 100 can check whether or not the processing results of the operator and the ground truth processing results of the requester contradict at an early stage of the processing on the plurality of processing targets.

Furthermore, the determination unit 132 determines to make the number of ground truth processing targets larger as the order of the processing by the operator is later. More specifically, the determination unit 132 determines to make the number of ground truth processing targets larger in a case where the order of the processing by the operator is the second threshold or more than in a case where the order of the processing by the operator goes below the second threshold.

Consequently, for example, the information processing apparatus 100 can appropriately detect deterioration of quality due to fatigue of the operator by including more ground truth processing targets in a second half of the plurality of processing targets that the operator gets tired of processing than in the first half of the plurality of processing targets.

Furthermore, the determination unit 132 dynamically determines the order for making the operator process the ground truth processing targets based on statistical information of evaluation values calculated by the calculation unit 135. More specifically, based on a transition of the evaluation value as the statistical information, the determination unit 132 determines to make the number of ground truth processing targets larger in a case where the evaluation value goes below the third threshold than in a case before the evaluation value goes below the third threshold.

Consequently, by, for example, analyzing a trend of deterioration of quality per operator based on the transition of the evaluation value and determining the third threshold, the information processing apparatus 100 can appropriately detect the deterioration of the quality per operator.

Furthermore, based on the transition of the evaluation value as the statistical information, the determination unit 132 determines to make the number of ground truth processing targets larger in a case where the evaluation value indicates a deterioration trend than in a case before the evaluation value indicates the deterioration trend.

Consequently, by, for example, including more ground truth processing targets after the evaluation value indicates the deterioration trend than before the evaluation value indicates the deterioration trend, the information processing apparatus 100 can stop deterioration of quality.

Furthermore, the determination unit 132 determines the number of ground truth processing targets larger to be included with respect to the number of the plurality of processing targets based on the evaluation value calculated by the calculation unit 135. For example, based on evaluation values of the plurality of operators, the determination unit 132 determines to make the number of the ground truth processing targets to be included with respect to the number of the plurality of processing targets larger for an operator having an evaluation value lower than those of other operators.

Consequently, the information processing apparatus 100 can save time and effort to prepare many ground truth processing targets that take time and effort to create, and efficiently distribute a limited number of ground truth processing targets.

Furthermore, the acceptance unit 134 accepts a processing result of the same processing target from each of a plurality of operators. The calculation unit 135 calculates a lower evaluation value for the operator who has processed a processing result indicating a trend different from those of the processing results accepted from other operators of the plurality of operators than evaluation values of the other operators.

Consequently, the information processing apparatus 100 can evaluate work contents of the operator even for the non-ground truth processing target. Consequently, the information processing apparatus 100 can save time and effort to prepare many ground truth processing targets that take time and effort to create, and efficiently distribute a limited number of ground truth processing targets.

Furthermore, the acceptance unit 134 further accepts the processing results of a plurality of processing targets that do not include the ground truth processing targets every time the operator completes the processing on part of the processing targets. The calculation unit 135 calculates an evaluation value indicating the evaluation on the operator based on the processing results accepted by the acceptance unit 134.

Consequently, the information processing apparatus 100 can calculate another evaluation value (e.g., a processing speed of the operator) indicating an evaluation other than the evaluation that is based on comparison with the ground truth processing target.

Furthermore, the information processing apparatus 100 further includes the decision unit 136 and the notification unit 137. The decision unit 136 decides whether the quality of the processing results has deteriorated based on the evaluation value calculated by the calculation unit 135. The notification unit 137 gives a notification of an alert to the administrator who manages operators' work. When the evaluation value calculated by the calculation unit 135 goes below the evaluation threshold, the decision unit 136 decides that the quality of the processing results has deteriorated. The notification unit 137 notifies the administrator of the alert when the decision unit 136 decides that the quality has deteriorated.

Consequently, when detecting deterioration of the quality of the processing results of the operator, the information processing apparatus 100 makes it possible to enable the administrator to encourage the operator to correct the deterioration of the quality.

Furthermore, the information processing apparatus 100 further includes the providing unit 133. The providing unit 133 provides a management screen that displays the processing status of each of the plurality of operators to the administrator apparatus 20 used by the administrator who manages the work of the operator. The calculation unit 135 calculates a rate of the number of processing targets processed by each of the plurality of operators with respect to the number of the plurality of processing targets. The providing unit 133 provides a management screen that displays as the processing status the rate calculated by the calculation unit 135 for each of the plurality of operators.

Consequently, the information processing apparatus 100 enables the administrator to check the processing status of the operator, and consequently enables the administrator to assign the processing targets or the ground truth processing targets according to the processing status of the operator.

Furthermore, the calculation unit 135 calculates a skill score that indicates a processing skill of each of the plurality of operators based on the evaluation value. The providing unit 133 provides a management screen that displays the skill score of each of the plurality of operators.

Consequently, the information processing apparatus 100 enables the administrator to check the skill of the operator, and consequently enables the administrator to assign the processing targets or the ground truth processing targets according to the skill of the operator.

Furthermore, the providing unit 133 provides a management screen that includes information for visually notifying the administrator of an operator having an evaluation value lower than those of other operators among the plurality of operators.

Consequently, the information processing apparatus 100 enables the administrator to grasp an operator having a lower evaluation value than those of other operators.

Furthermore, the information processing apparatus 100 further includes the providing unit 133 that causes the operator apparatus used by the operator to display the work screen for the operator to process the plurality of processing targets. The providing unit 133 causes the operator apparatus 10 to display the work screen for processing the ground truth processing targets, and the work screen for processing the other processing targets than the ground truth processing targets in a mode that these work screens cannot be visually distinguished.

Consequently, the operator cannot distinguish between the ground truth processing targets and other processing targets other than the ground truth processing targets, so that the information processing apparatus 100 can prevent the operator from performing processing attentively only when processing the ground truth processing targets.

Furthermore, the processing targets are training images used for learning of a machine learning model that recognizes an object included in the images. Furthermore, the processing is selection processing where the operator selects from the image an area where the object is captured. The acceptance unit 134 accepts selection areas of a plurality of images including the ground truth images associated with the ground truth selection areas every time the operator completes the area selection processing on part of the images. When an image associated with a selection area accepted by the acceptance unit 134 is a ground truth image, the calculation unit 135 calculates an evaluation value indicating the evaluation on the operator based on comparison between the selection area accepted by the acceptance unit 134 and the ground truth selection area.

Thus, the information processing apparatus 100 performs progress examination that is based on comparison between the selection area selected by the operator and the ground truth selection area in the middle of the annotation manually performed on the plurality of images.

Consequently, by periodically evaluating quality of annotation by progress examination on a regular basis, the information processing apparatus 100 can immediately detect that the quality of annotation has deteriorated, and consequently prevent deterioration of overall quality of annotation in advance. Consequently, the information processing apparatus 100 can ensure the quality of the annotation or the like.

7. Hardware Configuration

Furthermore, the information processing apparatus 100 according to the above-described embodiments is realized by a computer 1000 employing, for example, a configuration as illustrated in FIG. 14. FIG. 14 is a hardware configuration diagram illustrating an example of the computer that implements functions of the information processing apparatus 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400, and controls each unit. The ROM 1300 stores a boot program executed by the CPU 1100 when the computer 1000 is activated, a program that depends on hardware of the computer 1000, and the like.

The HDD 1400 stores a program executed by the CPU 1100, data used by the program, and the like. The communication interface 1500 receives data from another equipment via a predetermined communication network, sends the data to the CPU 1100, and transmits data generated by the CPU 1100 to the another equipment via the predetermined communication network.

The CPU 1100 controls an output apparatus such as a display or a printer, and an input apparatus such as a keyboard or a mouse via the input/output interface 1600. The CPU 1100 obtains data from the input apparatus via the input/output interface 1600. Furthermore, the CPU 1100 outputs the generated data to the output apparatus via the input/output interface 1600.

The media interface 1700 reads a program or data stored in a recording medium 1800, and provides the program or the data to the CPU 1100 via the RAM 1200. The CPU 1100 loads this program from the recording medium 1800 onto the RAM 1200 via the media interface 1700, and executes the loaded program. The recording medium 1800 is, for example, an optical recording medium such as a Digital Versatile Disc (DVD) or a Phase change rewritable Disk (PD), a magneto-optical recording medium such as a Magneto-Optical disk (MO), a tape medium, a magnetic recording medium, a semiconductor memory, or the like.

In a case where, for example, the computer 1000 functions as the information processing apparatus 100 according to the embodiment, the CPU 1100 of the computer 1000 realizes the function of the control unit 130 by executing the program loaded onto the RAM 1200. Although the CPU 1100 of the computer 1000 reads and executes these programs from the recording medium 1800, these programs may be obtained from another apparatus via a predetermined communication network in another example.

Although part of the embodiments of the present invention have been described in detail with reference to the drawings, these embodiments are mere examples, and the present invention can be implemented in other forms subjected to various modification and improvement based on the knowledge of those skilled in the art including the aspects described in the summary.

8. Others

Furthermore, among each processing described in the above embodiments and modified example, all or part of processing described as processing that is automatically performed can be manually performed, or all or part of processing described as processing that is manually performed can be automatically performed by a known method. Furthermore, processing procedures, specific names, and information including various items of data and parameters illustrated in the above description and drawings can be arbitrarily changed unless specified in particular. For example, the various pieces of information illustrated in each figure are not limited to the illustrated information.

Furthermore, each component of each illustrated apparatus is functionally conceptual, and does not necessarily need to be physically configured as illustrated. That is, a specific form of dispersion/integration of each apparatus is not limited to the illustrated form, and all or part of the specific form can be functionally or physically dispersed/integrated in an arbitrary unit according to various loads, use statuses, and the like.

Furthermore, the above-described embodiments and modified example can be appropriately combined within a range that does not contradict the processing contents.

Furthermore, a "part (a section, a module, and a unit)" described above can be read as "means", "circuit", or the like. For example, the calculation unit can be read as calculation means or a calculation circuit.

REFERENCE SIGNS LIST

1 INFORMATION PROCESSING SYSTEM
10 OPERATOR APPARATUS
20 ADMINISTRATOR APPARATUS
100 INFORMATION PROCESSING APPARATUS
110 COMMUNICATION UNIT
120 STORAGE UNIT
130 CONTROL UNIT
131 OBTAINING UNIT
132 DETERMINATION UNIT
133 PROVIDING UNIT
134 ACCEPTANCE UNIT
135 CALCULATION UNIT
136 DECISION UNIT
137 NOTIFICATION UNIT

The invention claimed is:

1. An information processing apparatus comprising:
    circuitry configured to
        accept processing results of a plurality of processing targets including a ground truth processing target associated with a ground truth processing result every time an operator completes processing on part of the processing targets;
        calculate, when a processing target associated with the accepted processing result is the ground truth processing target, an evaluation value indicating an evaluation on the operator based on comparison between the accepted processing result and the ground truth processing result;
        determine an order for making the operator process the ground truth processing targets amount the plurality of processing targets;
        accept the processing results of the plurality of processing targets including the ground truth processing target in the determined order; and
        calculate the evaluation value indicating the evaluation on the operator when the processing target associated with the accepted processing result is the ground truth processing target.

2. The information processing apparatus according to claim 1, wherein
    the circuitry is configured to determine to make a number of the ground truth processing targets larger as the order of the processing by the operator is earlier.

3. The information processing apparatus according to claim 2, wherein
    the circuitry is configured to determine to make a number of ground truth processing targets larger in a case where the order of the processing by the operator is a first threshold or less than in a case where the order of the processing by the operator exceeds the first threshold.

4. The information processing apparatus according to claim 1, wherein the circuitry is configured to determine to make a number of the ground truth processing targets larger as the order of the processing by the operator is later.

5. The information processing apparatus according to claim 4, wherein
the circuitry is configured to determine to make a number of the ground truth processing targets larger in a case where the order of the processing by the operator is a second threshold or more than in a case where the order of the processing by the operator goes below the second threshold.

6. The information processing apparatus according to claim 1, wherein
the circuitry is configured to dynamically determine the order for making the operator process the ground truth processing target, based on calculated statistical information of the evaluation value.

7. The information processing apparatus according to claim 6, wherein
the circuitry is configured to determine to make the number of the ground truth processing targets larger based on a transition of the evaluation value as the statistical information in a case where the evaluation value goes below a third threshold than in a case before the evaluation value goes below the third threshold.

8. The information processing apparatus according to claim 6, wherein
the circuitry is configured to determine to make the number of the ground truth processing targets larger based on the transition of the evaluation value as the statistical information in a case where the evaluation value indicates a deterioration trend than in a case before the evaluation value indicates the deterioration trend.

9. The information processing apparatus according to claim 1, wherein
the circuitry is configured to determine a number of the ground truth processing targets to be included with respect to a number of the plurality of processing targets based on the calculated evaluation value.

10. The information processing apparatus according to claim 9, wherein
the circuitry is configured to determine to make the number of the ground truth processing targets to be included with respect to the number of the plurality of processing targets larger for an operator having the evaluation value lower than the evaluation value of another operator based on evaluation values of the plurality of operators.

11. The information processing apparatus according to claim 1, wherein the circuitry is configured to:
accept a processing result of a same processing target from each of a plurality of operators; and
calculate a lower evaluation value for an operator than an evaluation value for another operator, the operator having processed a processing result indicating a trend different from a processing result accepted from the another operator among the plurality of operators.

12. The information processing apparatus according to claim 1, wherein the circuitry is configured to:
accept processing results of a plurality of processing targets that do not include the ground truth processing target every time the operator completes processing on part of the processing targets; and
calculate the evaluation value indicating the evaluation on the operator based on the accepted processing results.

13. The information processing apparatus according to claim 1, wherein the circuitry is configured to:
decide whether or not quality of the processing results has deteriorated based on the calculated evaluation value;
control a user interface to notify an administrator of an alert, the administrator managing work of the operator;
decide that the quality of the processing results has deteriorated when the calculated evaluation value goes below an evaluation threshold; and
control the user interface to notify the administrator of the alert.

14. The information processing apparatus according to claim 1, wherein the circuitry is configured to:
output a management screen to an administrator apparatus, the management screen displaying a processing status of each of a plurality of operators, and the administrator apparatus being used by an administrator who manages work of the operator;
calculate a rate of a number of processing targets processed by each of the plurality of operators with respect to a number of the plurality of processing targets;
output the management screen that displays as the processing status the calculated rate for each of the plurality of operators.

15. The information processing apparatus according to claim 14, wherein the circuitry is configured to:
calculate a skill score indicating a processing skill of each of the plurality of operators based on the evaluation value;
output the management screen that displays the skill score of each of the plurality of operators.

16. The information processing apparatus according to claim 14, wherein
the circuitry is configured to output the management screen including information for visually notifying the administrator of an operator having the evaluation value lower than an evaluation value of another operator among the plurality of operators.

17. The information processing apparatus according to claim 1, wherein the circuitry is configured to:
cause an operator apparatus used by the operator to display a work screen for the operator to process the plurality of processing targets; and wherein
cause the operator apparatus to display a work screen for processing the ground truth processing target, and a work screen for processing another processing target other than the ground truth processing target in a mode that the work screens cannot be visually distinguished.

18. The information processing apparatus according to claim 1, wherein
the processing target is a training image used for learning of a machine learning model that recognizes an object included in an image,
the processing is selection processing where the operator selects from the image an area where the object is captured,
the circuitry is configured to accept a selection area for a plurality of images including the ground truth image associated with a ground truth selection area every time the operator completes area selection processing on part of the images, and
when an image associated with the accepted selection area is the ground truth image, the circuitry is configured to calculate the evaluation value indicating the evaluation on the operator based on comparison between the accepted selection area and the ground truth selection area.

19. An information processing method executed by a computer, comprising:
- accepting processing results of a plurality of processing targets including a ground truth processing target associated with a ground truth processing result every time an operator completes processing on part of the processing targets;
- when a processing target associated with the processing result accepted in the accepting is the ground truth processing target, calculating an evaluation value indicating an evaluation on the operator based on comparison between the accepted processing result and the ground truth processing result; and
- determining an order for making the operator process the ground truth processing targets among the plurality of processing targets, wherein
- the accepting the processing results of the plurality of processing targets including the ground truth processing target in the determined order, and
- the calculating the evaluation value indicating the evaluation on the operator when the processing target associated with the accepted processing result is the ground truth processing target.

20. A non-transitory computer-readable storage medium having stored therein an information processing program causing a computer to execute:
- accepting processing results of a plurality of processing targets including a ground truth processing target associated with a ground truth processing result every time an operator completes processing on part of the processing targets;
- when a processing target associated with the processing result accepted in the accepting is the ground truth processing target, calculating an evaluation value indicating an evaluation on the operator based on comparison between the accepted processing result and the ground truth processing result; and
- determining an order for making the operator process the ground truth processing targets among the plurality of processing targets, wherein
- the accepting the processing results of the plurality of processing targets including the ground truth processing target in the determined order, and
- the calculating the evaluation value indicating the evaluation on the operator when the processing target associated with the accepted processing result is the ground truth processing target.

* * * * *